United States Patent
Nakagawa

(10) Patent No.: US 10,135,761 B2
(45) Date of Patent: Nov. 20, 2018

(54) SWITCH DEVICE, CONTROL METHOD, AND STORAGE MEDIUM

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 15/002,763

(22) Filed: Jan. 21, 2016

(65) Prior Publication Data
US 2016/0269322 A1    Sep. 15, 2016

(30) Foreign Application Priority Data
Mar. 9, 2015    (JP) .................... 2015-046413

(51) Int. Cl.
| | | |
|---|---|---|
| H04L 12/931 | (2013.01) | |
| H04L 12/835 | (2013.01) | |
| H04L 12/707 | (2013.01) | |
| H04L 12/721 | (2013.01) | |
| H04L 12/803 | (2013.01) | |

(52) U.S. Cl.
CPC ........... *H04L 49/505* (2013.01); *H04L 45/22* (2013.01); *H04L 45/38* (2013.01); *H04L 47/122* (2013.01); *H04L 47/30* (2013.01)

(58) Field of Classification Search
None
See application file for complete search history.

(56) References Cited

U.S. PATENT DOCUMENTS

| | | | | |
|---|---|---|---|---|
| 7,613,116 B1* | 11/2009 | Medina | ................. | H04L 49/351 370/235 |
| 7,668,103 B1* | 2/2010 | Pannell | .................. | H04L 47/10 370/235 |
| 9,473,408 B1* | 10/2016 | Kabbani | ............... | H04L 47/122 |
| 2002/0039366 A1* | 4/2002 | Sano | ..................... | H04L 47/15 370/390 |
| 2002/0118641 A1* | 8/2002 | Kobayashi | ............. | H04L 45/02 370/230 |
| 2002/0136163 A1* | 9/2002 | Kawakami | ............. | H04L 47/26 370/229 |

(Continued)

FOREIGN PATENT DOCUMENTS

| | | |
|---|---|---|
| JP | 2009-200905 | 9/2009 |
| JP | 2012-205048 | 10/2012 |

*Primary Examiner* — Jenee Holland
(74) *Attorney, Agent, or Firm* — Staas & Halsey LLP

(57) ABSTRACT

A switch device includes a plurality of ports respectively including a queue and transmits a flow including packets; and a processor configured to detect congestion in one of the plurality of ports, based on an amount of packets stored in the queues, receive, from another switch device, congestion information relating to the another switch device, specify a port coupled to a link where the congestion is not occurred, the link being one of a plurality of links coupled to the another switch device, based on the congestion information received from the another switch device, extract a target flow to which no packet stored in a queue of the specified port, from among a plurality of flows scheduled to be transmitted from the port in which the congestion is detected, and transmit a plurality of packets included in the extracted target flow from the specified port to the another switch device.

12 Claims, 25 Drawing Sheets

(56) References Cited

U.S. PATENT DOCUMENTS

| | | | |
|---|---|---|---|
| 2002/0181396 A1* | 12/2002 | Chen | H04L 47/10 370/229 |
| 2003/0058793 A1* | 3/2003 | Rochon | H04L 47/10 370/229 |
| 2003/0156540 A1* | 8/2003 | Trossen | H04L 12/1836 370/232 |
| 2003/0231635 A1* | 12/2003 | Kalkunte | H04L 12/5601 370/395.42 |
| 2004/0081145 A1* | 4/2004 | Harrekilde-Petersen | H04L 12/43 370/362 |
| 2004/0109411 A1* | 6/2004 | Martin | H04L 47/10 370/229 |
| 2004/0223452 A1* | 11/2004 | Santos | H04L 47/10 370/229 |
| 2005/0132078 A1* | 6/2005 | Kumar | H04L 49/90 709/230 |
| 2005/0204242 A1* | 9/2005 | Chou | H04L 1/0017 714/741 |
| 2005/0207417 A1* | 9/2005 | Ogawa | H04L 47/15 370/390 |
| 2006/0190620 A1* | 8/2006 | Kobayashi | H04L 41/12 709/242 |
| 2007/0136503 A1* | 6/2007 | Worrell | G06F 13/1605 710/240 |
| 2007/0280232 A1* | 12/2007 | Dec | H04L 12/18 370/390 |
| 2008/0101406 A1* | 5/2008 | Matoba | H04L 47/10 370/468 |
| 2010/0014528 A1* | 1/2010 | Amir | H04L 45/04 370/400 |
| 2011/0267952 A1* | 11/2011 | Ko | H04L 43/0864 370/237 |
| 2013/0077478 A1* | 3/2013 | Matsuura | H04L 45/22 370/225 |
| 2013/0142066 A1* | 6/2013 | Yamaguchi | H04L 49/109 370/252 |
| 2013/0301469 A1* | 11/2013 | Suga | H04W 72/085 370/253 |
| 2013/0343195 A1* | 12/2013 | Nagata | H04W 28/0284 370/235 |
| 2014/0119193 A1* | 5/2014 | Anand | H04L 47/125 370/237 |
| 2014/0126453 A1* | 5/2014 | Park | H04W 4/06 370/312 |
| 2014/0192646 A1* | 7/2014 | Mir | H04L 43/0829 370/235 |
| 2015/0078170 A1* | 3/2015 | Chrysos | H04L 47/115 370/236 |

* cited by examiner

FIG. 7

| Index | FLOW GROUP COUNTER | DETOUR | DETOUR DESTINATION |
|---|---|---|---|
| 00x00 | group counter #0 | 1 | 2 |
| 00x01 | group counter #1 | 0 | 0 |
| 00x02 | group counter #2 | 1 | 3 |
| ⋮ | ⋮ | ⋮ | ⋮ |
| 00xff | group counter #255 | 0 | 0 |

FIG. 17

| Index | FLOW GROUP COUNTER | DETOUR |
|---|---|---|
| 00x00 | group counter #0 | 1 |
| 00x01 | group counter #1 | 0 |
| 00x02 | group counter #2 | 1 |
| ⋮ | ⋮ | ⋮ |
| 00xff | group counter #255 | 0 |

58

SWITCH DEVICE, CONTROL METHOD, AND STORAGE MEDIUM

CROSS-REFERENCE TO RELATED APPLICATION

This application is based upon and claims the benefit of priority of the prior Japanese Patent Application No. 2015-046413, filed on Mar. 9, 2015, the entire contents of which are incorporated herein by reference.

FIELD

The embodiments discussed herein are related to a switch device, a control method, and a storage medium.

BACKGROUND

In an information processing system constructed by connecting information processing devices by using switches, link aggregation (LAG) is used as a redundancy technology for a layer 2. FIG. 24 is a diagram for explaining LAG. In FIG. 24, 4 information processing devices 2 indicated by S#0 to S#3 are connected by 2 switches 90 indicated by Switch#0 and Switch#1.

While the 2 switches 90 are connected by 4 physical links 90a, the 4 physical links 90a are regarded as one logical link in LAG. Since all paths between layer 2 switches (L2 switches) that support LAG are handled as active paths (paths capable of performing communication), the switches are able to effectively utilize paths. Furthermore, failover based on a detour path (backup) is available at the time of cable disconnection, and availability is improved.

Since order reversal of packets occurs, a simple round-robin method (in units of packets) is not appropriate as an algorithm for selecting paths. Usually, a hash value is calculated based on information of packets, such as an internet protocol (IP) address or a media access control (MAC) address, thereby selecting, based on the hash value, a physical link serving as a delivery destination of packets. Since, from this, a traffic is distributed in units of flows, no order inversion occurs. However, it is known that path selection becomes easy to be influenced by unevenness of a traffic for each of flows as the number of physical lines increases.

In LAG, there is a technology in which hash values and priorities of reception packets are held and output destinations of the reception packets are controlled based on the hash values, the priorities, and buffering states of the reception packets, thereby distributing the packets in units of flows without changing the order thereof (see, for example, Japanese Laid-open Patent Publication No. 2012-205048).

There is a technology for extending a band control rate per LAG group to the total rate of physical bands of all links configuring LAG groups even in a case where the LAG groups are formed across line cards (see, for example, Japanese Laid-open Patent Publication No. 2009-200905).

In LAG, there is a problem that if a path is changed in a case where unevenness of a traffic causes congestion to occur in the path, order reversal of packets occurs. The order reversal of packets causes performance deterioration of a transmission control protocol (TCP). Therefore, in a case where the congestion occur, it is desirable to avoid the order reversal of packets due to a detour and to be able to perform efficient detour control.

SUMMARY

According to an aspect of the invention, a switch device includes a plurality of ports respectively including a queue and transmits a flow including packets; and a processor configured to detect congestion in one of the plurality of ports, based on an amount of packets stored in the queues, receive, from another switch device, congestion information relating to the another switch device, specify, from among the plurality of ports, a port coupled to a link where the congestion is not occurred, the link being one of a plurality of links coupled to the another switch device, based on the congestion information received from the another switch device, extract a target flow to which no packet stored in a queue of the specified port, from among a plurality of flows scheduled to be transmitted from the port in which the congestion is detected, and transmit a plurality of packets included in the extracted target flow from the specified port to the another switch device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for explaining recording of a flow to be detoured;

FIG. 17 is a diagram for explaining recording of a flow to be detoured;

DESCRIPTION OF EMBODIMENTS

Hereinafter, embodiments of an information processing system, a switch device, and a control method for an information processing system, disclosed in the present application, will be described in detail, based on drawings. The embodiments do not limit the disclosed technology.

First Embodiment

Figure 1:
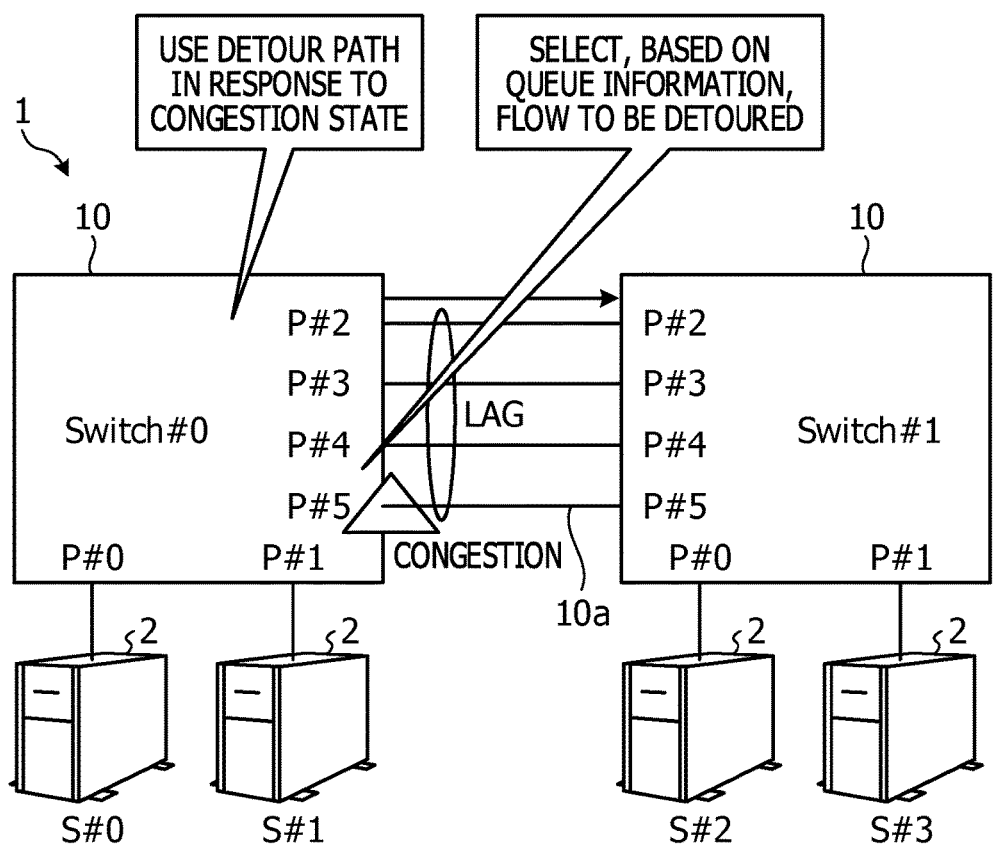
FIG. 1 is a diagram for explaining path changing based on a switch according to a first embodiment.

First, path changing based on a switch according to a first embodiment will be described. FIG. 1 is a diagram for explaining the path changing based on the switch according to the first embodiment. As illustrated in FIG. 1, an information processing system 1 according to the first embodiment includes 4 information processing devices 2 indicated by S#0 to S#3 and 2 switches 10 indicated by Switch#0 and Switch#1. In addition, in the information processing system 1, the 4 information processing devices 2 are connected by the 2 switches 10. The information processing devices 2 are devices that each perform information processing. The switches 10 are devices that each relay communication between the information processing devices.

The switches 10 each include 6 respective ports indicated by P#0 to P#5. P#0 and P#1 are connected to the respective information processing devices 2. P#2 to P#5 are connected to the other switch 10. The 2 switches 10 are connected by 4 physical links 10a by using P#2 to P#5. However, based on LAG, the 2 switches 10 are connected by one logical link. While, in FIG. 1, for convenience of explanation, the 4 physical links 10a configure one logical link, more physical links 10a may configure LAG.

Upon detecting a congestion state, Switch#0 selects a candidate for a detour destination, based on, for example, usage rates of paths of other ports. In addition, Switch#0 confirms that the candidate for a detour destination is not congested, and Switch#0 selects, as the detour destination, the candidate for the detour destination. In addition, Switch#0 selects, based on queue information of a detour source, a flow whose path is to be changed, and Switch#0 changes a path of the selected flow from the detour source to the detour destination. If the congestion state of the detour source is released, Switch#0 confirms queue information of the detour destination and restores the path of the detoured flow to an original path.

In FIG. 1, a congestion state is detected in P#5, and the path of a flow selected from among flows whose packets are transmitted from P#5 is changed to a detour destination. In addition, if the congestion state of P#5 is released, the path of the flow, changed to the detour destination, is restored to the path of P#5.

Figure 2:
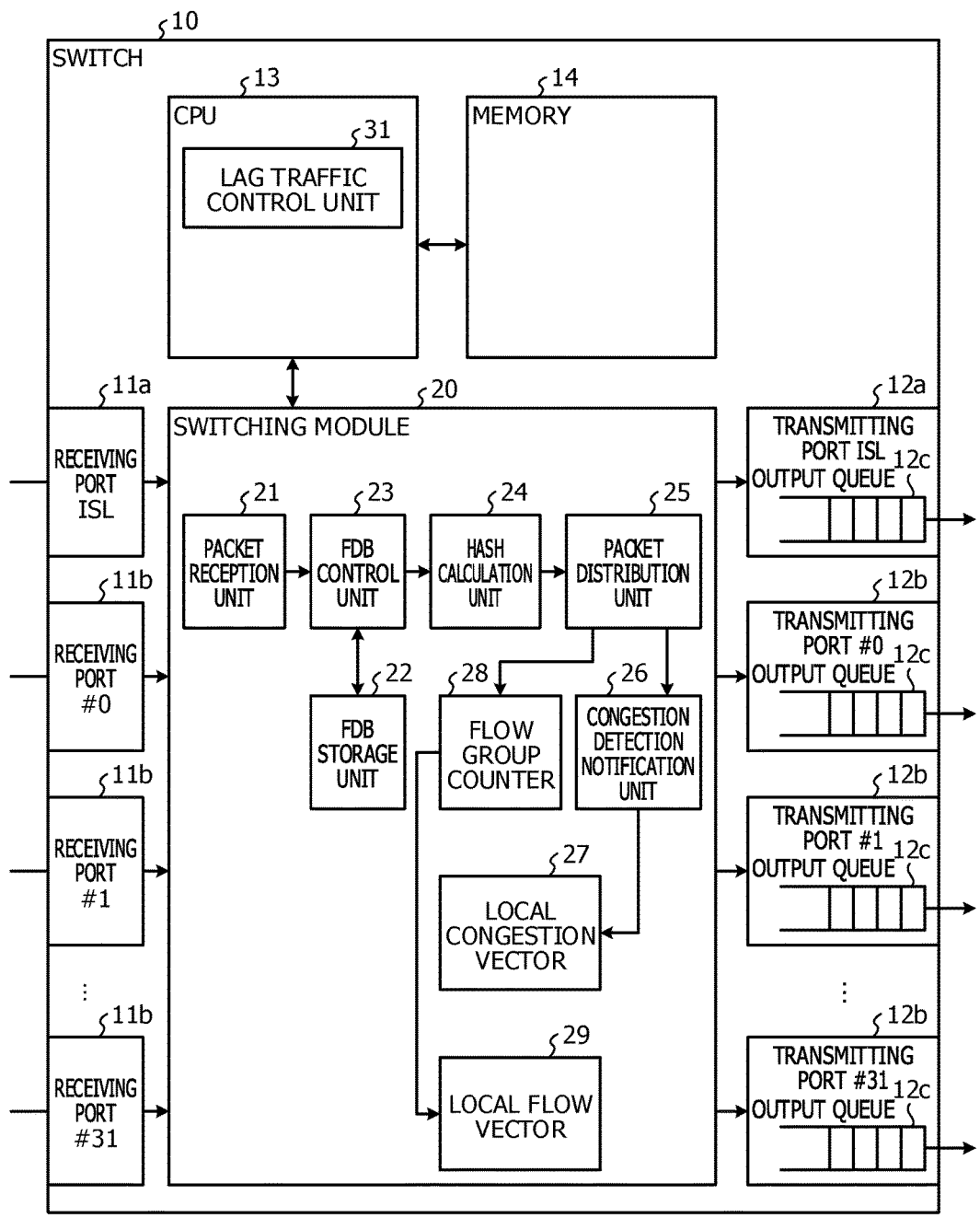
FIG. 2 is a diagram illustrating a configuration of the switch according to the first embodiment.

Next, configurations of the switches 10 according to the first embodiment will be described. FIG. 2 is a diagram illustrating the configurations of the switches according to the first embodiment. As illustrated in FIG. 2, the switches 10 each include a receiving port 11a represented by a receiving port inter switch link (ISL) and 32 receiving ports 11b represented by a receiving port #0 to a receiving port #31. The switches 10 each include a transmitting port 12a represented by a transmitting port ISL and 32 transmitting ports 12b represented by a transmitting port #0 to a transmitting port #31. The switches 10 each include a central processing unit (CPU) 13, a memory 14, and a switching module 20.

The receiving port 11a is a port that receives packets transmitted from another spine via ISL in a case where the corresponding switch 10 is used as a spine of multi-chassis LAG (MLAG). MLAG and the spine will be described in a second embodiment. Each of the receiving ports 11b is a port that receives packets transmitted by the connected information processing device 2 or switch 10.

The transmitting port 12a is a port that transmits packets to another spine in a case where the corresponding switch 10 is used as a spine of MLAG. Each of the transmitting ports 12b is a port that transmits packets to the connected information processing device 2 or the other switch 10. The transmitting port 12a and the transmitting ports 12b each include an output queue 12c. The output queue 12c is a queue that stores therein packets output by the corresponding switch 10.

The CPU 13 is a central processing unit that reads and executes a program from the memory 14. By executing the program, the CPU 13 realizes a function of an LAG traffic control unit 31. Based on congestion information of the transmitting ports 12b and storage states of the output queues 12c, the LAG traffic control unit 31 controls paths of traffics. Details of the LAG traffic control unit 31 will be described later. The memory 14 is a random access memory (RAM) that stores therein the program, an intermediate result of program execution, and so forth.

Based on destinations of packets received by the receiving port 11a and the receiving ports 11b, the switching module 20 distributes the packets into the transmitting port 12a and the transmitting ports 12b. The switching module 20 includes a packet reception unit 21, a forwarding database (FDB) storage unit 22, an FDB control unit 23, a hash calculation unit 24, and a packet distribution unit 25. The switching module 20 further includes a congestion detection notification unit 26, a local congestion vector 27, a flow group counter 28, and a local flow vector 29.

The packet reception unit 21 receives packets received by the receiving port 11a and the receiving ports 11b. The FDB storage unit 22 stores therein a database for searching, from destinations of packets, for logical ports from which the packets are output. The FDB storage unit 22 stores therein correspondences between MAC addresses, VLAN numbers, and logical port numbers. The FDB control unit 23 searches FDB stored by the FDB storage unit 22 and acquires logical ports from which packets are output. In the following description, it is assumed that the 32 transmitting ports 12b correspond to one logical transmitting port based on LAG and are connected to the 32 respective receiving ports 11b of the other switch 10 by using the respective physical links 10a.

The hash calculation unit 24 calculated a hash value of a packet from 5 tuples. Here, the 5 tuples are a transmission source IP address, a transmission destination IP address, a transmission source port number, a destination port number, and a protocol. The packet distribution unit 25 maps, to the transmitting ports 12b, a hash value calculated by the hash calculation unit 24, thereby distributing a packet to be transmitted to one of the transmitting ports 12b.

The congestion detection notification unit 26 detects congestion states of the transmitting ports 12b, notifies the LAG traffic control unit 31 thereof, and sets the local congestion vector 27. The local congestion vector 27 stores therein a congestion state for each of the transmitting ports 12b. If one of the transmitting ports 12b is put into a congestion state, a corresponding bit of the local congestion vector 27 is set to "1".

Figure 3:
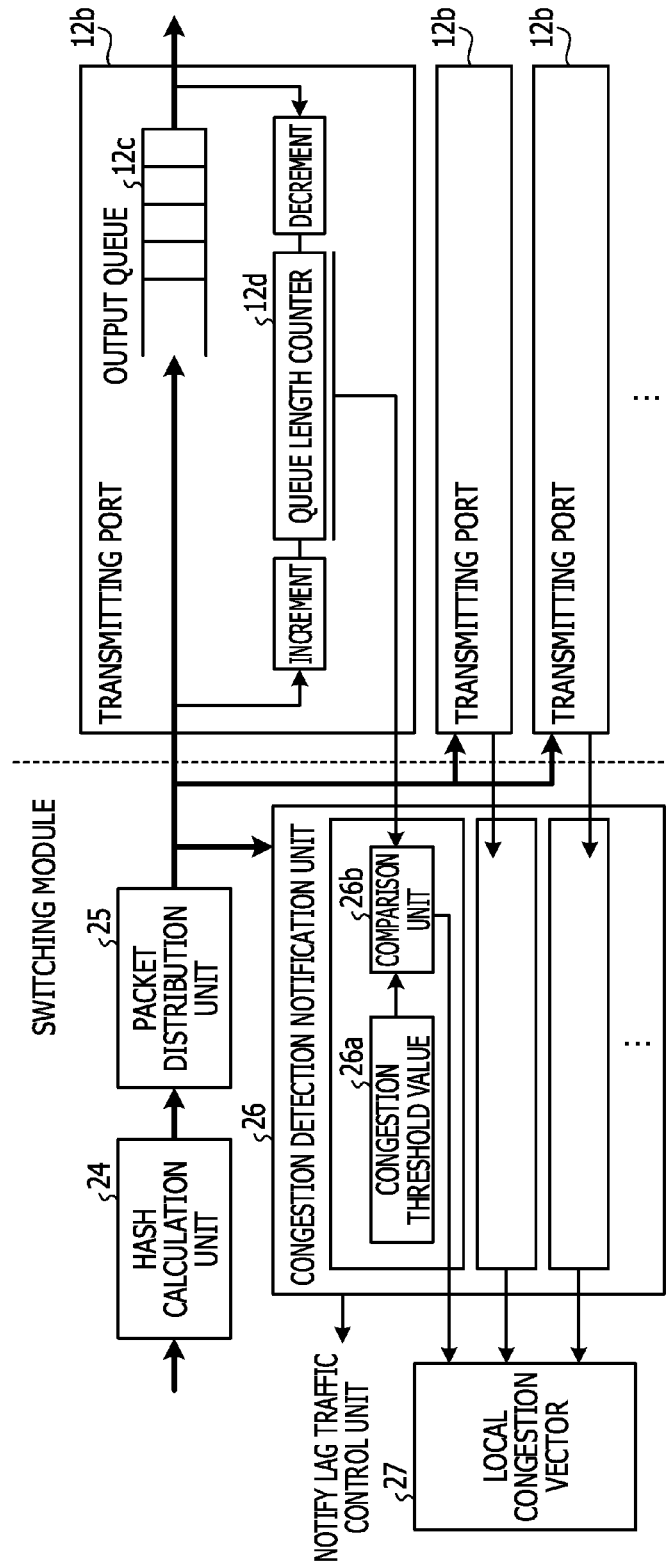
FIG. 3 is a diagram for explaining detection and notification of a congestion state, based on a congestion detection notification unit.

FIG. 3 is a diagram for explaining detection and notification of a congestion state, based on the congestion detection notification unit 26. As illustrated in FIG. 3, the transmitting ports 12b each include a queue length counter 12d that counts the length of the output queue 12c, in addition to the output queue 12c. If a packet is input to the output queue 12c, the queue length counter 12d is incremented. If a packet is output from the output queue 12c, the queue length counter 12d is decremented.

For each of the transmitting ports 12b, the congestion detection notification unit 26 stores therein a congestion threshold value 26a indicating a threshold value of congestion detection and includes a comparison unit 26b that compares the value of the corresponding queue length counter 12d with the congestion threshold value 26a. In addition, if the queue length of the corresponding output queue 12c exceeds, based on a comparison result of the comparison unit 26b, the congestion threshold value 26a, the congestion detection notification unit 26 sets a corresponding bit of the local congestion vector 27 to "1". In a case where the queue length of the corresponding output queue 12c exceeds the congestion threshold value 26a and a TCP session request is received, the congestion detection notification unit 26 notifies the LAG traffic control unit 31 of congestion detection along with a port number and a hash value.

If a congestion state is released, the congestion detection notification unit 26 notifies the LAG traffic control unit 31 of congestion release and sets a corresponding bit of the local congestion vector 27 to "0".

Figure 4:
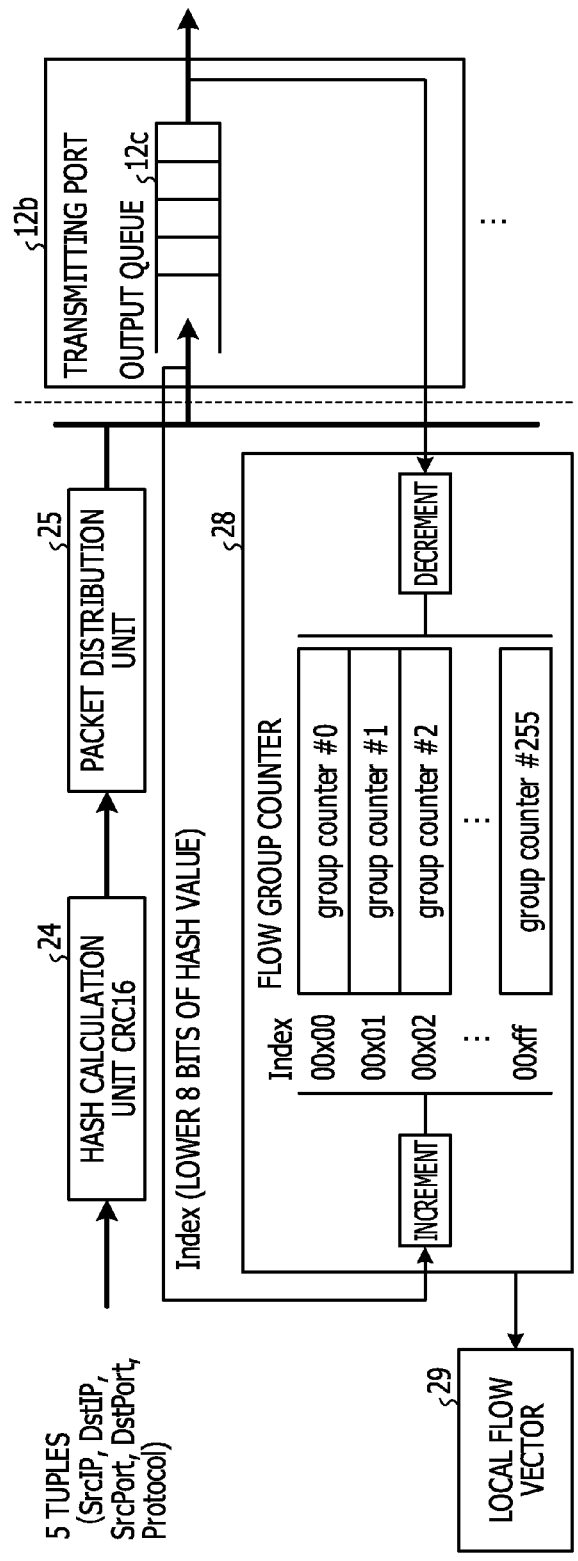
FIG. 4 is a diagram for explaining a flow group counter.

The flow group counter 28 is a counter that counts the number of packets that are included in the corresponding output queue 12c and that belong to a flow group (flow set) into which flows sharing a common hash value are grouped. FIG. 4 is a diagram for explaining the flow group counter 28. As illustrated in FIG. 4, the flow group counter 28 includes an entry for each of flow groups. In FIG. 4, the flow group counter 28 includes 256 entries of a group counter #0 to a group counter #255.

Based on a lower 8 bits of a hash value calculated from the 5 tuples of a packet, a flow is grouped. In addition, if a packet is input to one of the output queues 12c, the corresponding group counter #n ($0 \leq n \leq 255$) is incremented. If a packet is output from one of the output queues 12c, the corresponding group counter #n is decremented.

In FIG. 4, the number of the output queues 12c and the number of entries of the flow group counter 28 have a 1-to-256 relationship. However, the number of the output queues 12c and the number of entries of the flow group counter 28 may have an M-to-N relationship in which M and N are integers. While, in FIG. 4, the value of the counter is increased or decreased based on the number of packets, the value of the counter may be increased or decreased based on a packet length. As illustrated in FIG. 7, described later, the flow group counter 28 includes bits, which each indicate whether or not a flow group is detoured, and port numbers of detour destinations while associating the bits and the port numbers of detour destinations with respective entries.

The local flow vector 29 is a vector of 256 bits indicating a state of the flow group counter 28. A bit n of the local flow vector 29 is set to "0" in a case where a value of the group counter #n is "0", and the bit n of the local flow vector 29 is set to "1" in a case where the value of the group counter #n is a value other than "0". In other words, that the bit n of the local flow vector 29 is "0" indicates that no packet belonging to a corresponding flow group exists in the output queue 12c.

Next, details of the LAG traffic control unit 31 will be described. The LAG traffic control unit 31 performs determination of whether or not a detour path is usable, selection of a flow to be detoured, recording of a flow to be detoured, and detour cancellation determination at the time of releasing a congestion state.

Figure 5:
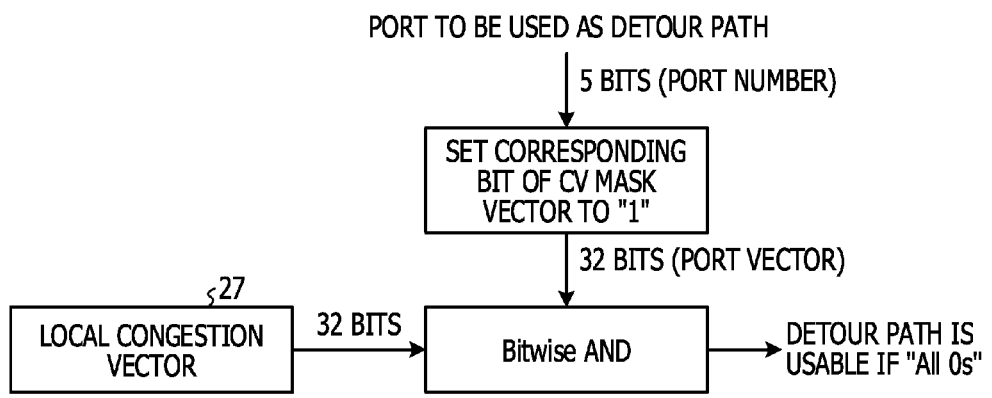
FIG. 5 is a diagram for explaining determination of whether or not a detour path is usable.

FIG. 5 is a diagram for explaining determination of whether or not a detour path is usable. The LAG traffic control unit 31 confirms a congestion state of a detour path by using the local congestion vector 27 and determines whether or not the detour path is usable. The LAG traffic control unit 31 generates a 32-bit CV mask vector indicating another transmitting port 12b to be used as a detour path. The LAG traffic control unit 31 obtains AND of the local congestion vector 27 and the mask vector and in a case of all "0s", the LAG traffic control unit 31 determines that the detour path is usable.

Figure 6:
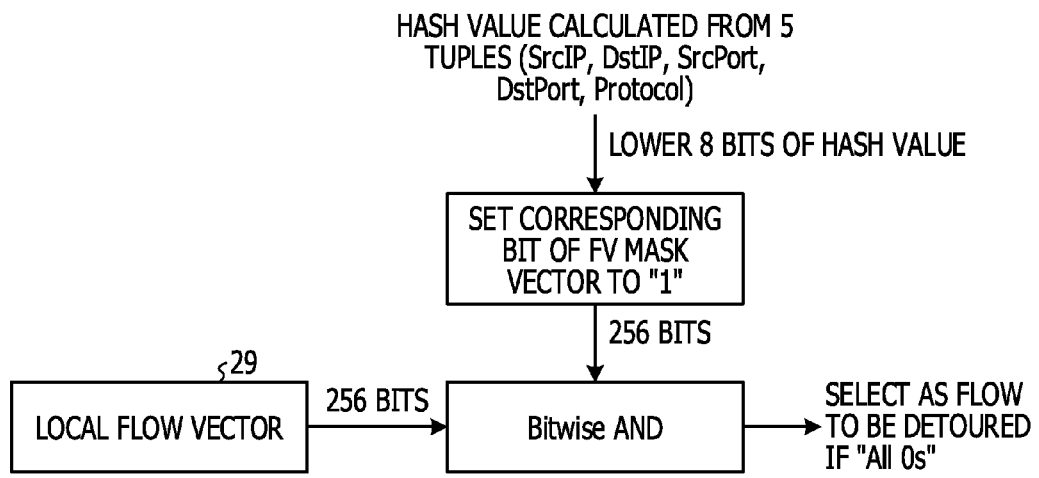
FIG. 6 is a diagram for explaining selection of a flow to be detoured.

FIG. 6 is a diagram for explaining selection of a flow to be detoured. As illustrated in FIG. 6, by using the local flow vector 29, the LAG traffic control unit 31 selects, as a flow to be detoured, a flow whose packet is not queued in the corresponding output queue 12c.

Specifically, for a TCP flow whose session is newly initiated, the LAG traffic control unit 31 generates an FV mask vector of 256 bits, based on the lower 8 bits of a hash value calculated from 5 tuples of a SYN packet. In addition, the LAG traffic control unit 31 obtains AND of the local flow vector 29 and the FV mask vector. As a result, in a case of all "0s", the LAG traffic control unit 31 selects, as a flow to be detoured, a flow included in a flow group corresponding to the lower 8 bits of the hash value.

By detouring in this way while targeting the TCP flow whose session is newly initiated, the LAG traffic control unit 31 is able to avoid reversal of the reception order of packets without increasing a load of the CPU. The LAG traffic control unit 31 does not detour a flow of a flow group already queued in the corresponding output queue 12c and detours a flow of a flow group not queued. Accordingly, the LAG traffic control unit 31 is able to inhibit reversal of the reception order of packets from occurring in a flow that belongs to a detoured flow group and that is excluded from the TCP flow whose session is newly initiated, and it is possible to perform efficient detour control.

FIG. 7 is a diagram for explaining recording of a flow to be detoured. As illustrated in FIG. 7, upon selecting a flow group to be detoured, the LAG traffic control unit 31 records information for detouring in a corresponding entry of the flow group counter 28. Specifically, the LAG traffic control unit 31 sets, to "1", a bit indicating a detour and records the port number of a detour destination. In, for example, FIG. 7, a flow belonging to a flow group corresponding to the group counter #0 is detoured, and the detour destination is the transmitting port #2. After that, packets belonging to the flow included in the detoured flow group are detoured.

Figure 8:
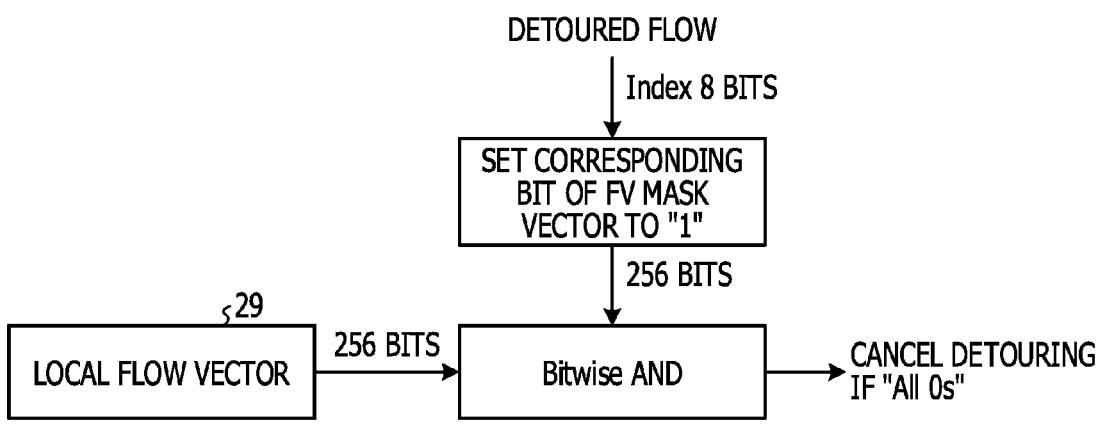
FIG. 8 is a diagram for explaining detour cancellation determination at the time of releasing a congestion state.

FIG. 8 is a diagram for explaining detour cancellation determination at the time of releasing a congestion state. As illustrated in FIG. 8, after confirming, by using the local flow vector 29, a free space of the output queue 12c in the transmitting port 12b serving as a detour destination, the LAG traffic control unit 31 cancels detouring for a detoured flow. Specifically, the LAG traffic control unit 31 generates an FV mask vector of 256 bits in which a bit corresponding to a detoured flow group is set to "1". The LAG traffic control unit 31 obtains AND of the local flow vector 29 and the FV mask vector. In a case of all "0s", the LAG traffic control unit 31 determines that it is possible to cancel detouring.

Figure 9:
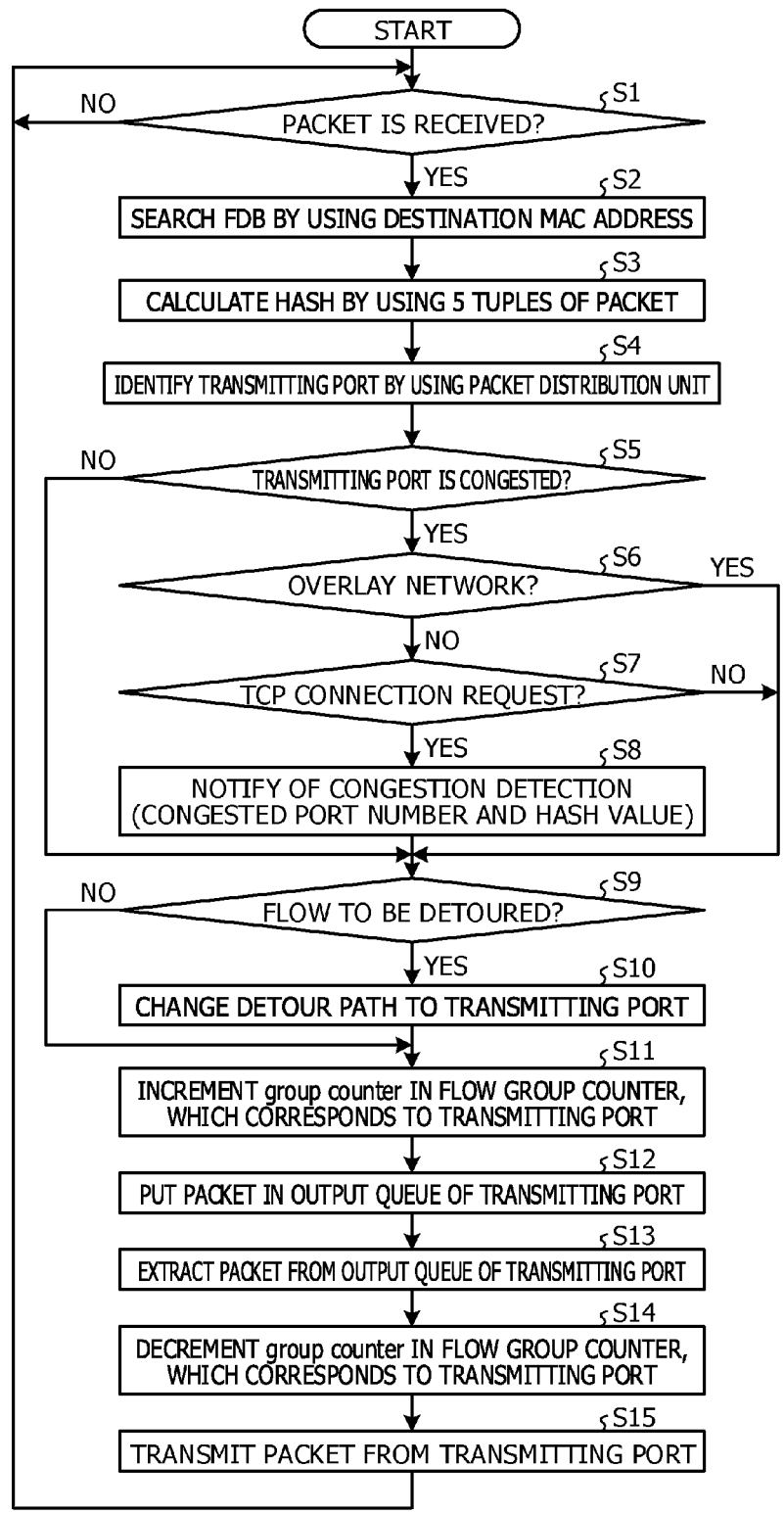
FIG. 9 is a flowchart illustrating a flow of processing in a case where a switch receives a packet.

Next, a flow of processing in a case where the switch 10 receives a packet will be described. FIG. 9 is a flowchart illustrating the flow of the processing in a case where the switch 10 receives a packet. As illustrated in FIG. 9, the packet reception unit 21 determines whether or not a packet is received (S1). In a case of determining that no packet is received, the packet reception unit 21 waits for a packet to be received.

On the other hand, in a case of reception, the FDB control unit 23 searches FDB by using a destination MAC address and identifies a logical port to transmit packets (a logical port corresponding to LAG configured by one or more physical ports) (S2). In addition, the hash calculation unit 24 performs hash calculation by using 5 tuples of a packet (S3), and based on a hash value, the packet distribution unit 25 identifies one of the transmitting ports 12b (a physical port to transmit the packet) (S4).

In addition, the congestion detection notification unit 26 determines whether the transmitting port 12b is congested (S5), and in a case of being determined as not congested, the congestion detection notification unit 26 shifts control to S9. On the other hand, in a case of being congested, the congestion detection notification unit 26 determines whether or not being an overlay network (S6). In a case of being determined as the overlay network, an original TCP frame is encapsulated by an outer header of UDP. Therefore, since it is difficult to determine whether or not the packet is a TCP connection request, the congestion detection notification unit 26 shifts control to S9.

On the other hand, in a case of being determined as not the overlay network, the congestion detection notification unit 26 determines whether or not the packet is the TCP connection request (S7), and in a case of being determined as not the TCP connection request, the processing proceeds to S9. On the other hand, in a case of the TCP connection request, the congestion detection notification unit 26 sends a congestion detection notification (the number of the congested transmitting port 12b and the hash value of the packet) to the LAG traffic control unit 31 (S8).

In addition, the packet distribution unit 25 references detour information of the flow group counter 28, which corresponds to the hash value, and determines whether or not being a flow to be detoured (S9). In a case of being determined as a flow to be detoured, the packet distribution unit 25 changes a detour path to the transmitting port 12b (S10), and in a case of being determined as not a flow to be detoured, the packet distribution unit 25 proceeds to S11.

In addition, the packet distribution unit 25 increments a group counter in the flow group counter 28, which corresponds to the transmitting port 12b, (S11) and puts the packet in the output queue 12c of the transmitting port 12b (S12). In addition, the transmitting port 12b extracts a packet from the output queue 12c (S13) and decrements the group counter in the flow group counter 28, which corresponds to the transmitting port 12b (S14). In addition, the transmitting port 12b transmits the packet from the transmitting port 12b (S15).

In this way, the congestion detection notification unit 26 transmits a congestion detection notification to the LAG traffic control unit 31 in a case where the packet is the TCP connection request. Accordingly, the switch 10 is able to detour a packet at a timing when a new flow is generated.

Figure 10:
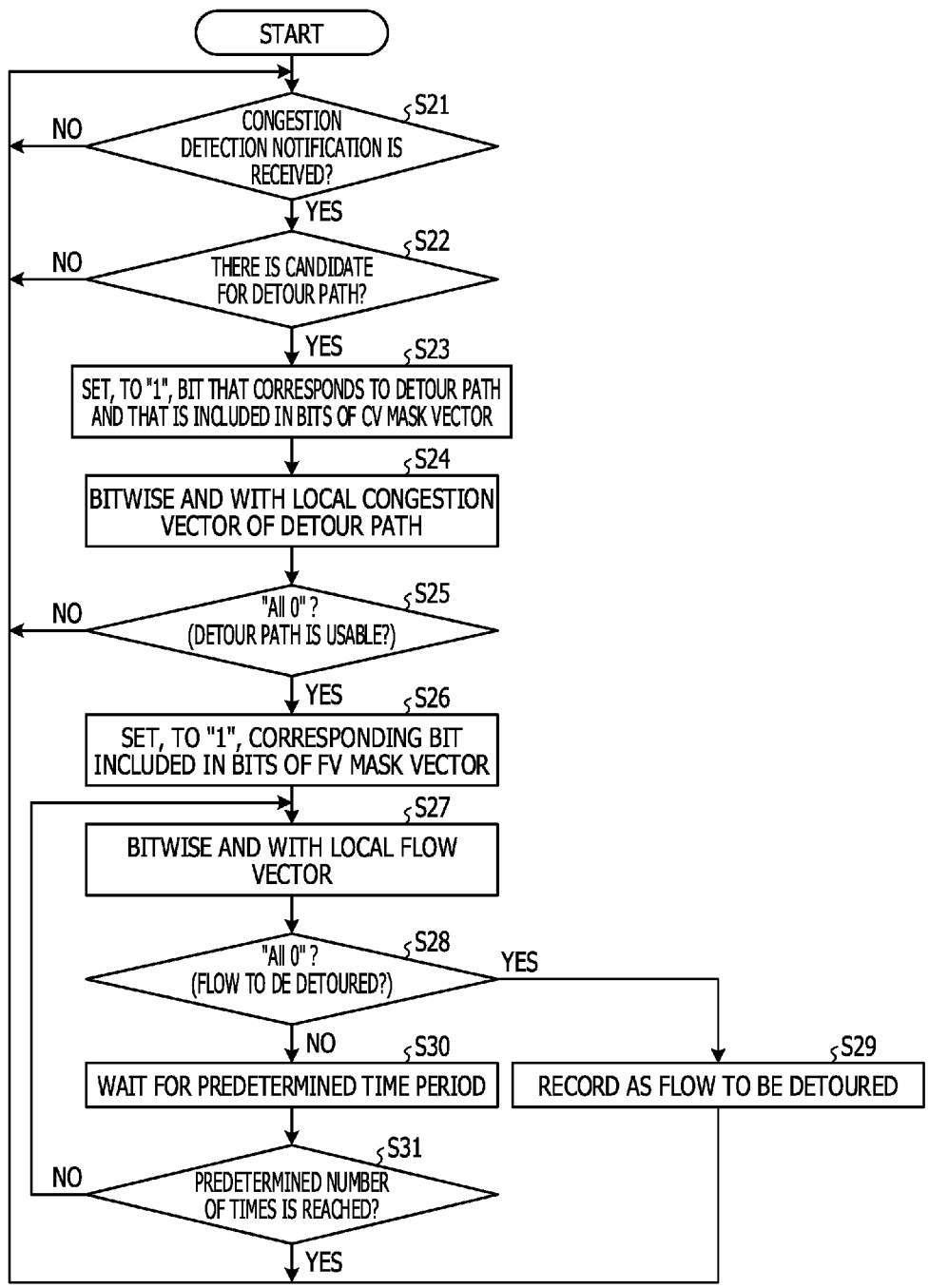
FIG. 10 is a flowchart illustrating a flow of processing for selection of a detour flow based on an LAG traffic control unit.

Next, a flow of processing for selection of a detour flow based on the LAG traffic control unit 31 will be described. FIG. 10 is a flowchart illustrating the flow of processing for selection of a detour flow based on the LAG traffic control unit 31. As illustrated in FIG. 10, the LAG traffic control unit 31 determines whether or not a congestion detection notification is received from the congestion detection notification unit 26 (S21). In a case of being determined as not received, the LAG traffic control unit 31 waits for a congestion detection notification to be received.

On the other hand, in a case of being received, the LAG traffic control unit 31 determines whether or not there is another transmitting port 12b to serve as a candidate for a detour path (S22). As an example of a case where there is no candidate for a detour path, there is, for example, a case where all the other transmitting ports 12b belonging to the same LAG are subjected to "link down". In a case where it is determined that there is no other transmitting port 12b to serve as a candidate for a detour path, the LAG traffic control unit 31 returns to S21 and waits for a subsequent congestion detection notification to be received.

On the other hand, in a case where it is determined that there is the other transmitting port 12b to serve as a candidate for a detour path, the LAG traffic control unit 31 sets, to "1", a bit that corresponds to the detour path and that is included in bits of the CV mask vector (S23). In addition, the LAG traffic control unit 31 obtains bitwise AND of the CV mask vector and the local congestion vector 27 of the detour path (S24) and determines whether or not an operation result is "All 0s" (S25). In a case of being determined as not "All 0s", the LAG traffic control unit 31 returns to S21 and waits for a subsequent congestion detection notification to be received.

On the other hand, in a case of being determined as "All 0s", the LAG traffic control unit 31 sets, to "1", a bit that is included in bits of the FV mask vector and that corresponds to a flow group to which a target flow to serve as a target of detouring belongs (S26). In addition, the LAG traffic control unit 31 obtains bitwise AND of the FV mask vector and the local flow vector 29 of the detour source transmitting port 12b (S27) and determines whether or not an operation result is "All 0s" (S28).

In a case of being determined as "All 0s", the LAG traffic control unit 31 records, as a flow to be detoured, the target flow in a corresponding entry of the flow group counter 28 (S29) and returns to S21. On the other hand, in a case where it is determined that the operation result is not "All 0s", the LAG traffic control unit 31 waits for a predetermined time period (S30) and determines whether or not the predetermined number of times is reached (S31).

In a case where it is determined that the predetermined number of times is not reached, the LAG traffic control unit 31 returns to S27 and obtains bitwise AND of the FV mask vector and the local flow vector 29 of the detour source transmitting port 12b again. On the other hand, in a case where the predetermined number of times is reached, the LAG traffic control unit 31 returns to S21.

By referencing the local flow vector 29 of the detour source transmitting port 12b in this way, the LAG traffic control unit 31 is able to detour a flow belonging to a flow group whose packet is not stored in the corresponding output queue 12c.

Figure 11:
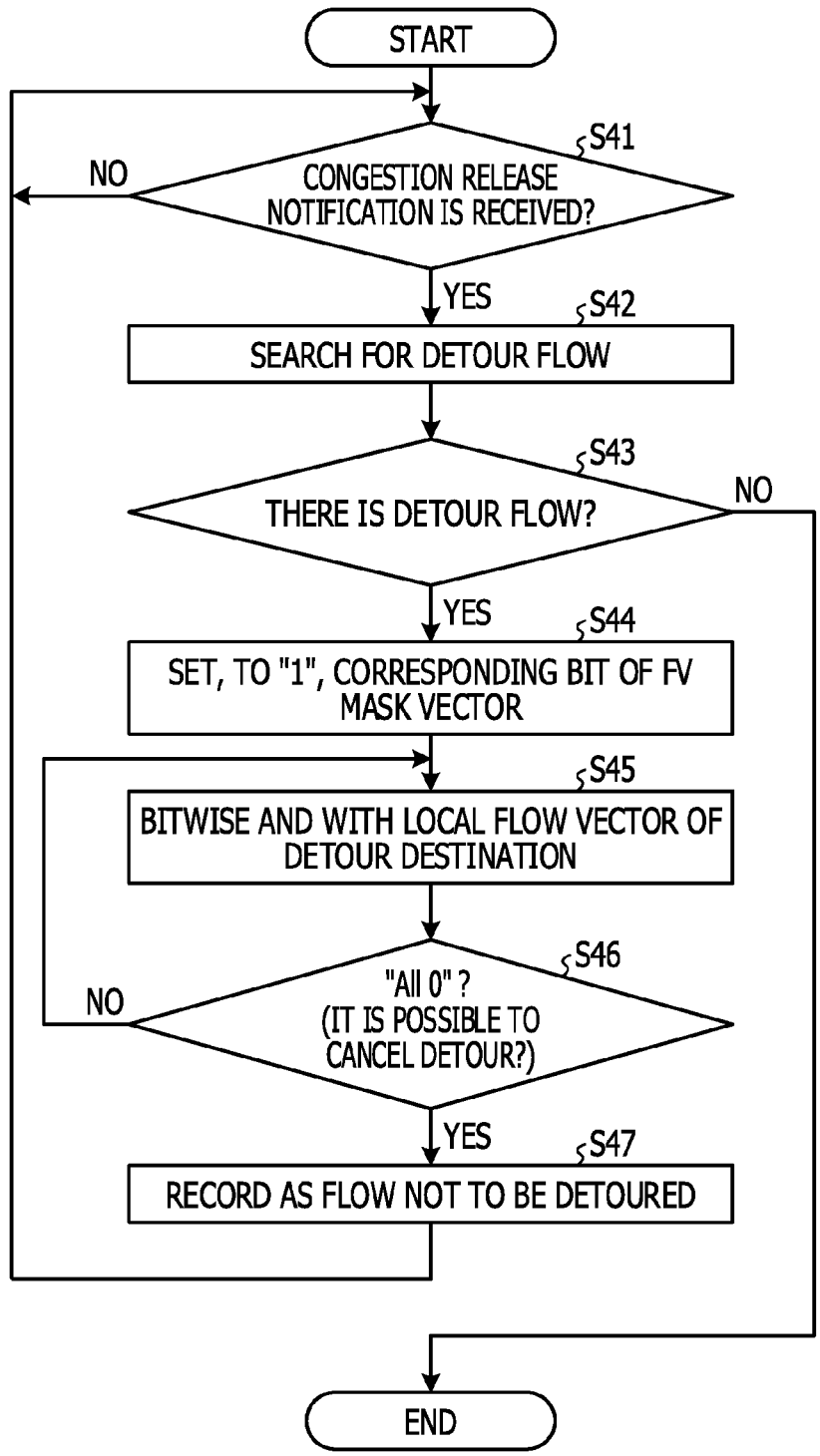
FIG. 11 is a flowchart illustrating a flow of processing for flow detour cancellation based on the LAG traffic control unit.

Next, a flow of processing for flow detour cancellation based on the LAG traffic control unit 31 will be described. FIG. 11 is a flowchart illustrating the flow of processing for flow detour cancellation based on the LAG traffic control unit 31. As illustrated in FIG. 11, the LAG traffic control unit 31 determines whether or not a congestion release notification is received from the congestion detection notification unit 26 (S41). In a case of being determined as not received, the LAG traffic control unit 31 waits for the congestion release notification to be received.

On the other hand, in a case of being received, the LAG traffic control unit 31 references the flow group counter 28 of the corresponding transmitting port 12b, thereby searching for a detour flow, (S42) and determines whether or not there is a detour flow (S43). In a case where it is determined that there is no detour flow, the LAG traffic control unit 31 terminates the processing.

On the other hand, in a case where it is determined that there is a detour flow, the LAG traffic control unit 31 sets a corresponding bit of the FV mask vector to "1" (S44) and obtains bitwise AND of the FV mask vector and the local flow vector 29 of a detour destination (S45). In addition, the LAG traffic control unit 31 determines whether or not an operation result is "All 0s" (S46).

In a case of being determined as not "All 0s", the LAG traffic control unit 31 returns to S45, and in a case of being determined as "All 0s", the LAG traffic control unit 31 records, as a flow not to be detoured, in a corresponding entry of the flow group counter 28 (S47).

By referencing the local flow vector 29 of a detour destination in this way, the LAG traffic control unit 31 cancels detouring in a case where no packet is stored in the corresponding output queue 12c. Accordingly, the switch 10 is able to avoid reversal of the arrival order of packets, associated with cancellation of detouring.

As described above, in the first embodiment, in a case of receiving the TCP session request in a congestion state, the congestion detection notification unit 26 notifies the LAG traffic control unit 31 of congestion detection. Accordingly, in a case where a new flow is generated, the LAG traffic control unit 31 is able to detour the flow and to inhibit the reception order of packets from being reversed in the other switch 10 without increasing a load of the CPU.

In the first embodiment, the LAG traffic control unit 31 references the local flow vector 29, thereby detouring a flow belonging to a flow group whose packet is not stored in the corresponding output queue 12c. Accordingly, the switch 10 only detours a flow whose packets are already transmitted to the other switch 10. Therefore, it is possible to inhibit the reception order of packets from being reversed in the other switch 10.

In the first embodiment, by referencing the local flow vector 29, the LAG traffic control unit 31 cancels detouring in a case where no packet is stored in the corresponding output queue 12c. Accordingly, the switch 10 cancels detouring only in a case where packets are already transmitted to the other switch 10. Therefore, it is possible to inhibit the reception order of packets from being reversed in the other switch 10.

In the first embodiment, in a case where the value of the queue length counter 12d exceeds the congestion threshold value 26a, the congestion detection notification unit 26 detects congestion and notifies the LAG traffic control unit 31 thereof. Accordingly, the switch 10 is able to reliably sense congestion.

In the first embodiment, whether or not each of the group counters in the flow group counter 28 is "0" is reflected in the local flow vector 29. Accordingly, using the local flow vector 29, the switch 10 is able to confirm a state of the corresponding output queue 12c.

In the first embodiment, for each of the flow groups, it is confirmed whether a packet is stored in the output queue 12c. By selecting a relationship between the number of the output queues 12c and the number of entries in the flow group counter 28, it is possible to reduce the flow group counter to a desired hardware size. Accordingly, for each of the flow groups, the switch 10 is able to determine whether or not detouring is available, and compared with a case where, for each of the flows, it is determined whether or not detouring is available, it is possible to reduce a hardware amount of the switch 10.

Second Embodiment

Figure 12:
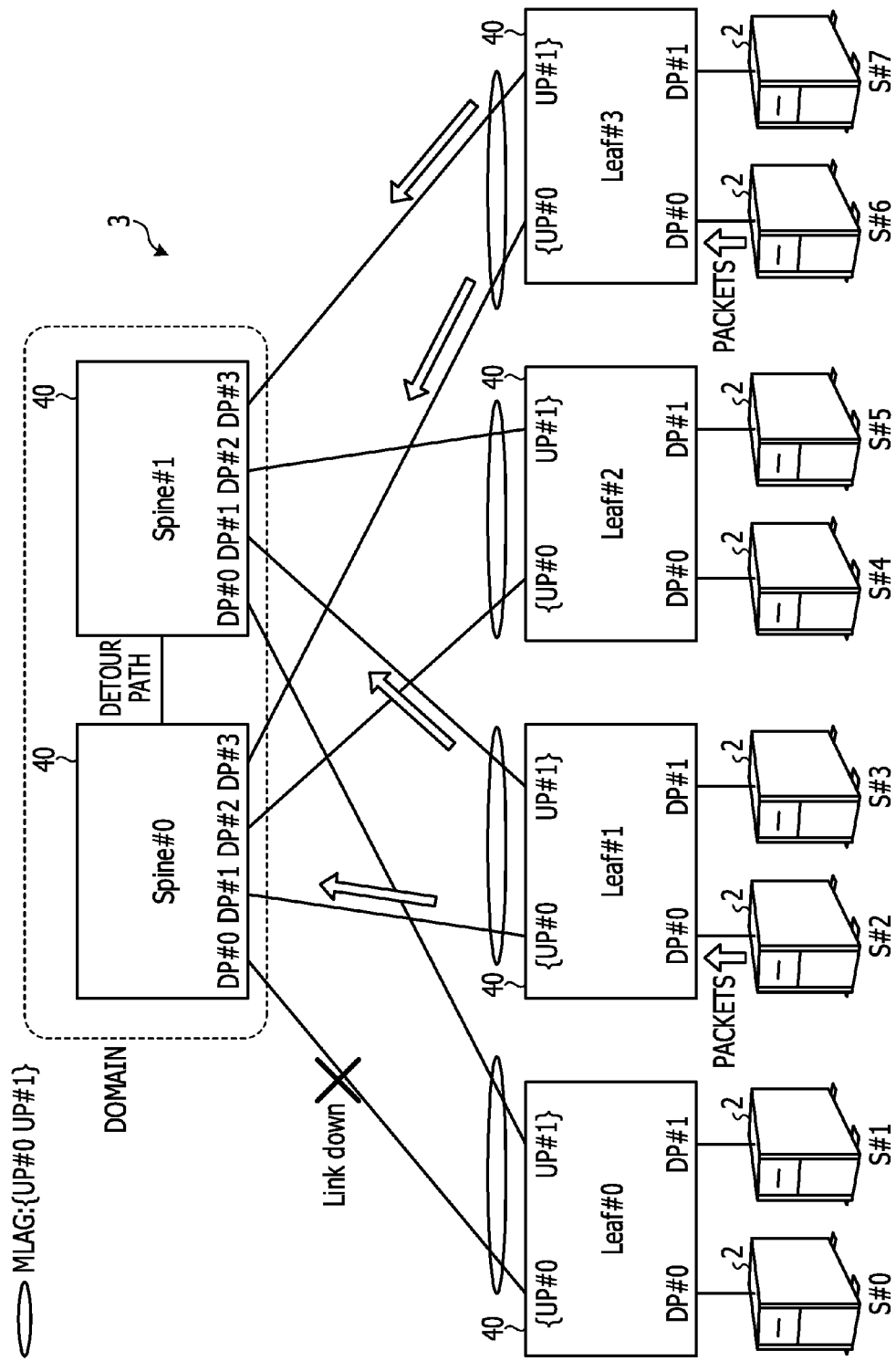
FIG. 12 is a diagram for explaining MLAG.

While a case of LAG is described in the first embodiment, a case of MLAG will be described in a second embodiment. Here, the term "MLAG" means LAG realized by devices. FIG. 12 is a diagram for explaining MLAG. As illustrated in FIG. 12, an information processing system 3 according to the second embodiment includes 8 information processing devices 2 indicated by S#0 to S#7 and 6 switches 40 indicated by Leaf#0 to Leaf#3, Spine#0, and Spine#1. Here, a leaf (Leaf) is one of the switches 40, which is directly connected to the corresponding information processing devices 2. A spine (Spine) is one of the switches 40 other than Leafs. The switches 40 are devices that each relay communication between information processing devices.

Each of the leafs includes 2 ports UP#0 and UP#1 for being connected to respective spines. UP#0 is connected to Spine#0, and UP#1 is connected to Spine#1. Each of the spines includes 4 ports DP#0 to DP#3 for being connected to respective leafs. DP#0 is connected to Leaf#0, DP#1 is connected to Leaf#1, DP#2 is connected to Leaf#2, and DP#3 is connected to Leaf#3.

Each of the leafs includes a path for communicating with other leafs via Spine#0 and a path for communicating with other leafs via Spine#1 and configures MLAG. For example, packets addressed to S#0 by S#6 are to be sent from one of UP#0 and UP#1 of Leaf#3. If a link between Spine#0 and Leaf#0 is down, the packets sent from UP#0 reach Leaf#0 via Spine#0→Spine#1→DP#0. In this way, Spine#0 and Spine#1 that realize MLAG in relation to leafs configure one domain.

The band of communication performed between the spines by using ISL is narrower than the band of communication performed between spines and leafs. While, in FIG. 12, for convenience of explanation, a case where the 2 spines configure the domain is described, the domain may be configured by more spines.

Figure 13:
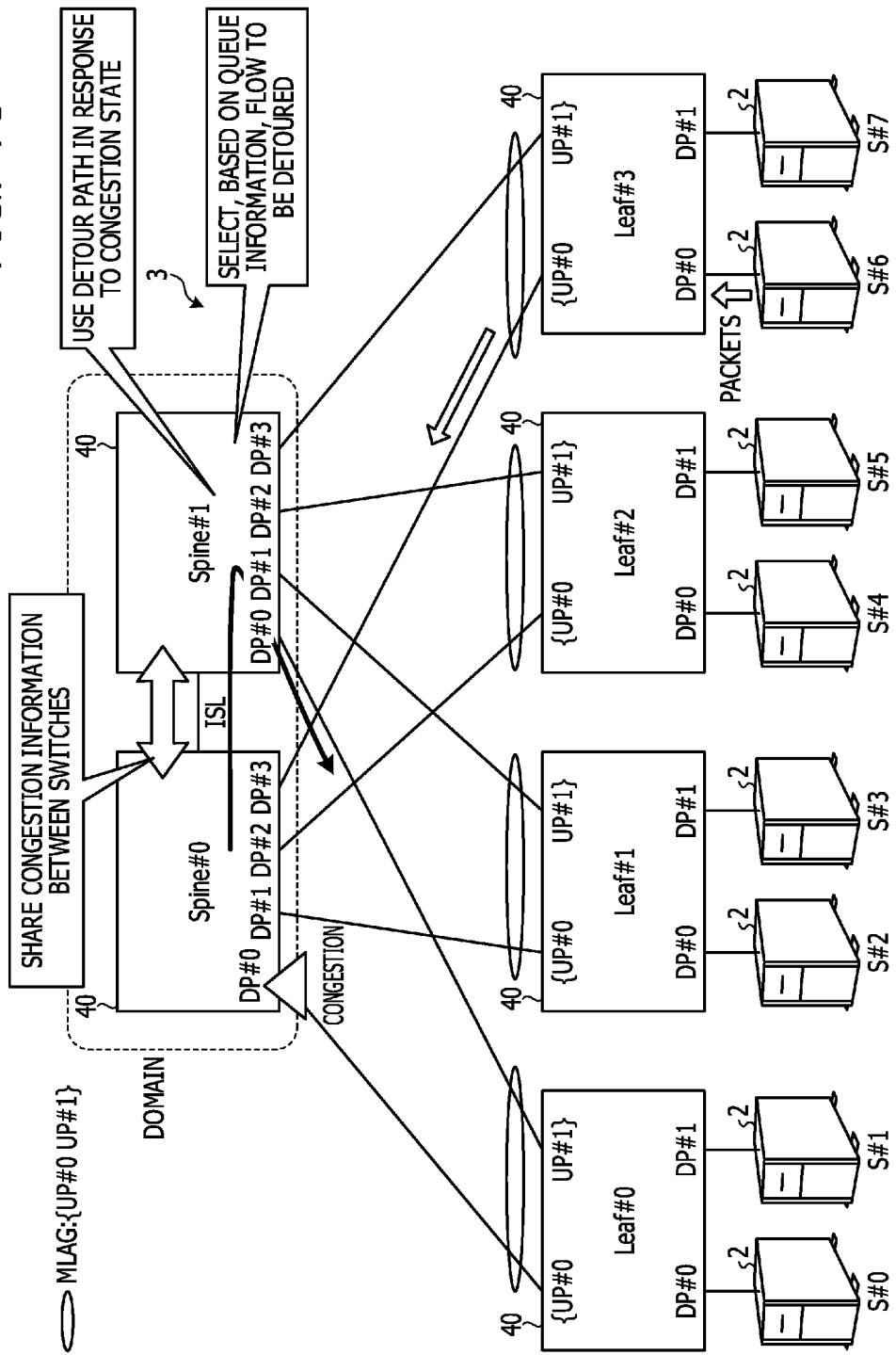
FIG. 13 is a diagram for explaining path changing based on switches according to a second embodiment.

Next, path changing based on the switches 40 according to the second embodiment will be described. FIG. 13 is a diagram for explaining the path changing based on the switches 40 according to the second embodiment. As illustrated in FIG. 13, in the information processing system 3 according to the second embodiment, congestion information is shared between Spine#0 and Spine#1 belonging to the same domain in addition to FDB. In addition, upon detecting a congestion state in one of paths leading to the leafs, Spine#0 confirms that a path of Spine#1 is not congested, and Spine#0 uses a detour path routed through ISL. Upon detecting a congestion state of, for example, DP#0, Spine#0 confirms that DP#0 of Spine#1 is not congested, thereby using DP#0 of Spine#1 as a detour path.

Based on queue information of DP#0, Spine#0 selects a flow to use the detour path. In addition, Spine#0 detours the selected flow via Spine#1. After that, if the congestion state of DP#0 is released, Spine#0 confirms information of an output queue 12c of DP#0 of Spine#1. In addition, in a case where no packet of the detoured flow is stored in the output queue 12c, Spine#0 restores the path of the detoured flow to an original path.

In this way, Spine#0 shares the congestion information with Spine#1, confirms that a path of Spine#1 is not congested, and uses a detour path. Accordingly, Spine#0 is able to perform efficient path changing.

Figure 14:
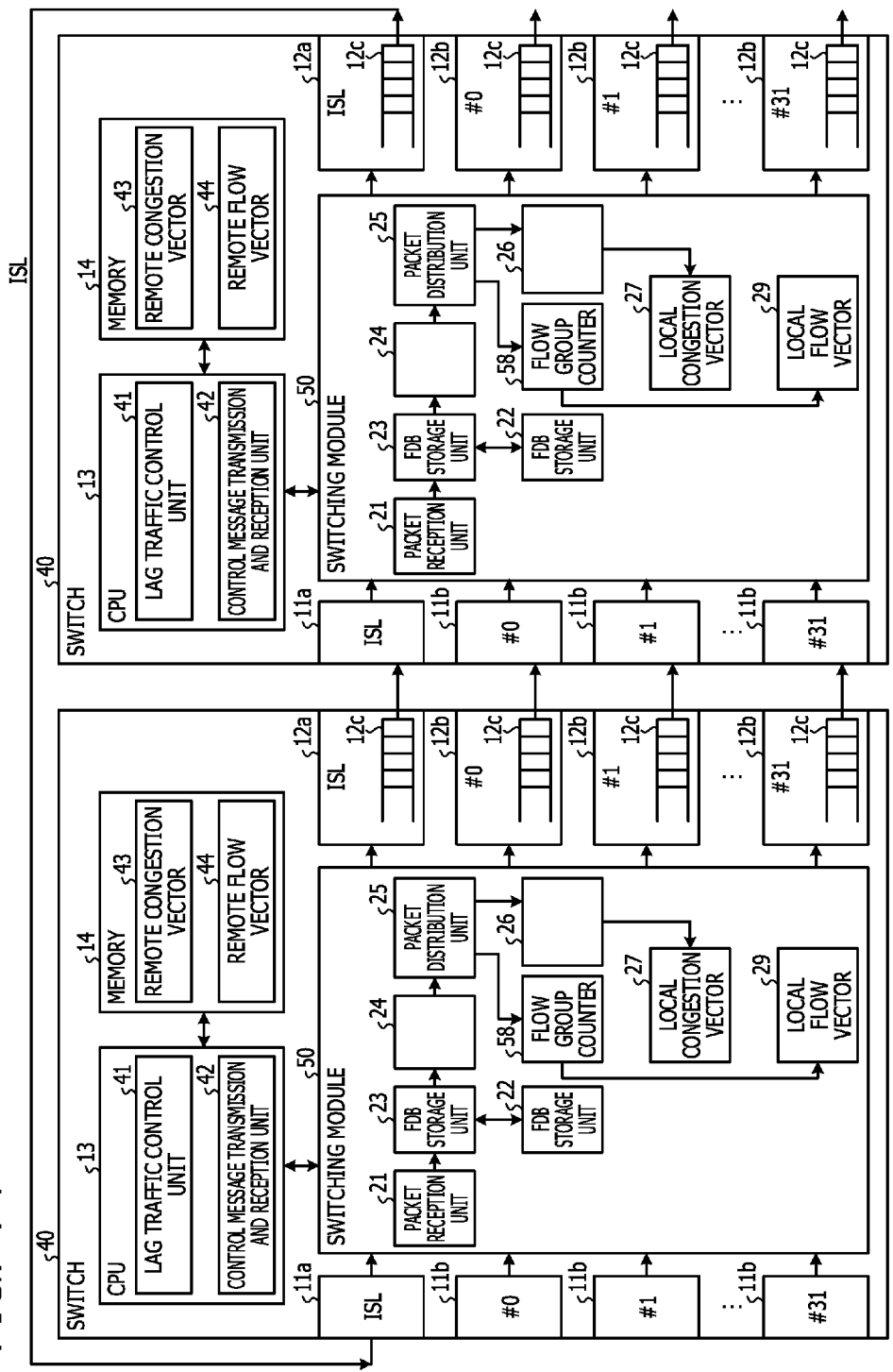
FIG. 14 is a diagram illustrating configurations of switches according to the second embodiment.

Next, configurations of the switches 40 according to the second embodiment will be described. FIG. 14 is a diagram illustrating the configurations of the switches 40 according to the second embodiment. Here, for convenience of explanation, a same symbol is assigned to a functional unit that fulfills the same role as that of one of individual units illustrated in FIG. 2, and the detailed description thereof will be omitted.

As illustrated in FIG. 14, compared with FIG. 2, the switches 40 each include a switching module 50 in place of the switching module 20. The switching module 50 includes a flow group counter 58 in place of the flow group counter 28. Unlike the flow group counter 28, the flow group counter 58 stores no detour destination. The reason is that while, in the second embodiment, being different in a spine, a detour source and a detour destination are equal in the number of the transmitting port 12b.

By executing a program, the CPU 13 realizes functions of a LAG traffic control unit 41 and a control message transmission and reception unit 42. Using a control message, the control message transmission and reception unit 42 transmits and receives congestion information to and from another spine. The control message transmission and reception unit 42 stores, in the memory 14, the received congestion information as a remote congestion vector 43 and a remote flow vector 44. Here, the term "remote" indicates another switch 40. In contrast, the term "local" indicates the switch 40 itself.

Figure 15:
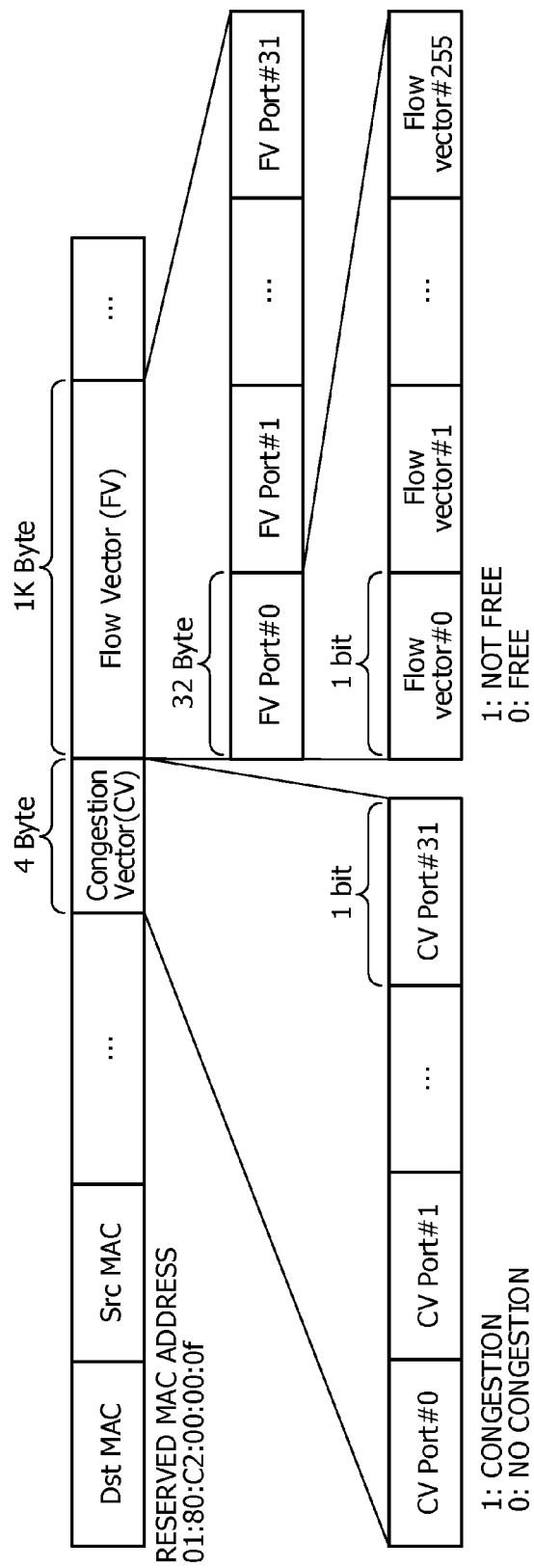
FIG. 15 is a diagram illustrating a control message between spines.

FIG. 15 is a diagram illustrating a control message between spines. As illustrated in FIG. 15, the control message includes Dst MAC, Src MAC, a congestion vector (CV), and a flow vector (FV). Dst MAC is a reserved MAC address of a protocol data unit (PDU) and is 01:80:C2:00:00:0f. Src MAC is a MAC address of the switch 40 that transmits the control message. CV is the local congestion vector 27 of the 32 transmitting ports 12b. FV is the local flow vector 29 of 256 bits of the 32 transmitting ports 12b.

Regarding an information amount used for sharing the congestion state, 1 bit (a congestion state)×32 (ports)=32 bits=4 bytes is satisfied for CV, and 1 bit (a free state)×256 (flow groups)×32 (ports)=8 Kbits=1 Kbytes is satisfied for FV. Accordingly, if a message interval is 100 μs, (1 Kbytes×8 bits/100 μs)/10 Gbps=0.008 is satisfied. Therefore, a band usage rate in a link of, for example, 10 G (giga) is just about 0.8%.

Figure 16:
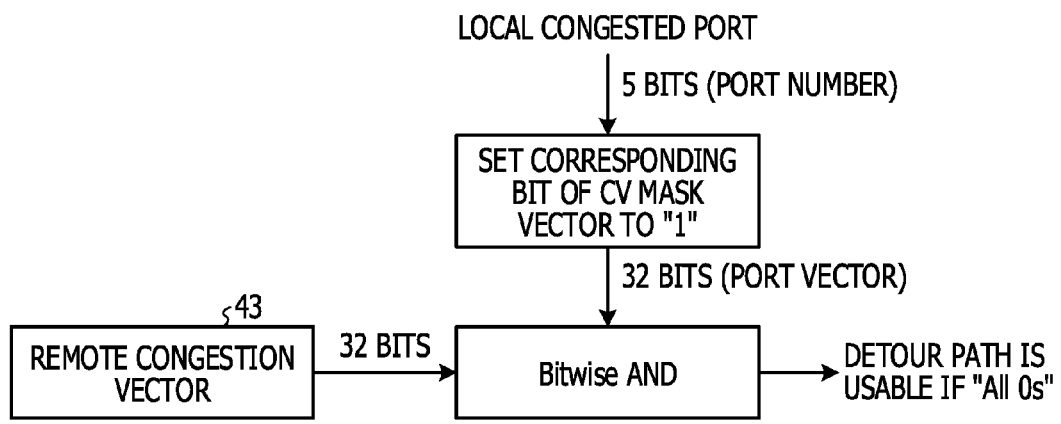
FIG. 16 is a diagram for explaining determination of whether or not a detour path is usable.

The LAG traffic control unit 41 has the same function as that of the LAG traffic control unit 31. However, in a case of determining whether or not a detour path is usable, the LAG traffic control unit 41 uses the remote congestion vector 43 in place of the local congestion vector 27. FIG. 16 is a diagram for explaining determination of whether or not a detour path is usable. Compared with FIG. 5, in FIG. 16, bitwise AND of the remote congestion vector 43 and the CV mask vector is obtained.

The LAG traffic control unit 41 records no port number of a detour destination in the flow group counter 58. FIG. 17 is a diagram for explaining recording of a flow to be detoured. As illustrated in FIG. 17, upon selecting a flow group to be detoured, the LAG traffic control unit 41 sets, to "1", a bit indicating a detour of a corresponding entry of the flow group counter 58 while recording no port number of a detour destination.

In a case where a congestion state is released, the LAG traffic control unit 41 confirms a free space of the output queue 12c of a detour destination by using the remote flow vector 44 in place of the local flow vector 29, and after that, the LAG traffic control unit 41 cancels detouring.

Figure 18:
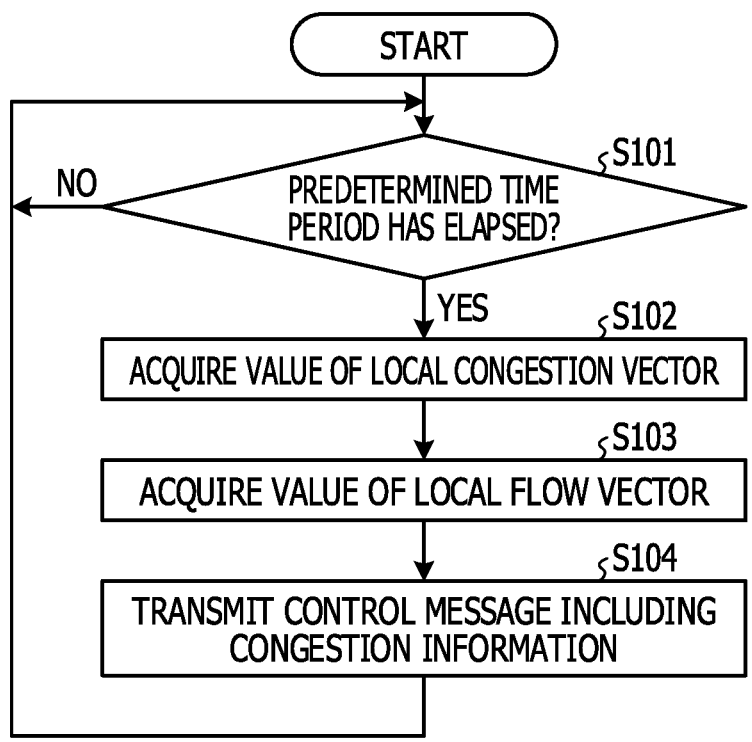
FIG. 18 is a flowchart illustrating a flow of transmission processing for a control message.

Next, flows of control message transmission and reception processing operations based on the control message transmission and reception unit 42 will be described. FIG. 18 is a flowchart illustrating a flow of transmission processing for a control message, and FIG. 19 is a flowchart illustrating a flow of reception processing for a control message.

As illustrated in FIG. 18, the control message transmission and reception unit 42 determines whether or not a predetermined time period has elapsed (S101). In a case where it is determined that the predetermined time period has not elapsed, the control message transmission and reception unit 42 waits for the predetermined time period to elapse. On the other hand, in a case where it is determined that the predetermined time period has elapsed, the control message transmission and reception unit 42 acquires, as the congestion information, the values of the local congestion vector 27 and the local flow vector 29 (S102 and S103) and transmits a control message including the congestion information (S104).

Figure 19:
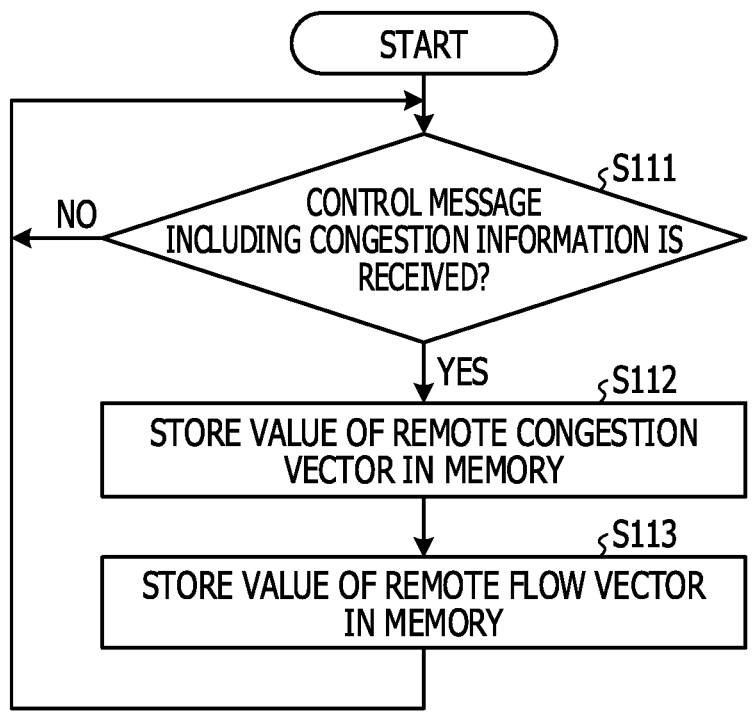
FIG. 19 is a flowchart illustrating a flow of reception processing for a control message.

As illustrated in FIG. 19, the control message transmission and reception unit 42 determines whether or not a control message including the congestion information is received (S111). In a case where it is determined that the control message including the congestion information is not received, the control message transmission and reception unit 42 waits for the control message including the congestion information to be received.

On the other hand, in a case where it is determined that the control message including the congestion information is received, the control message transmission and reception unit 42 stores, in the memory 14, the values of the remote congestion vector 43 and the remote flow vector 44 (S112 and S113).

In this way, the control message transmission and reception unit 42 transmits and receives the control messages each including the congestion information. Accordingly, a spine is able to share the congestion information with another spine.

Figure 20:
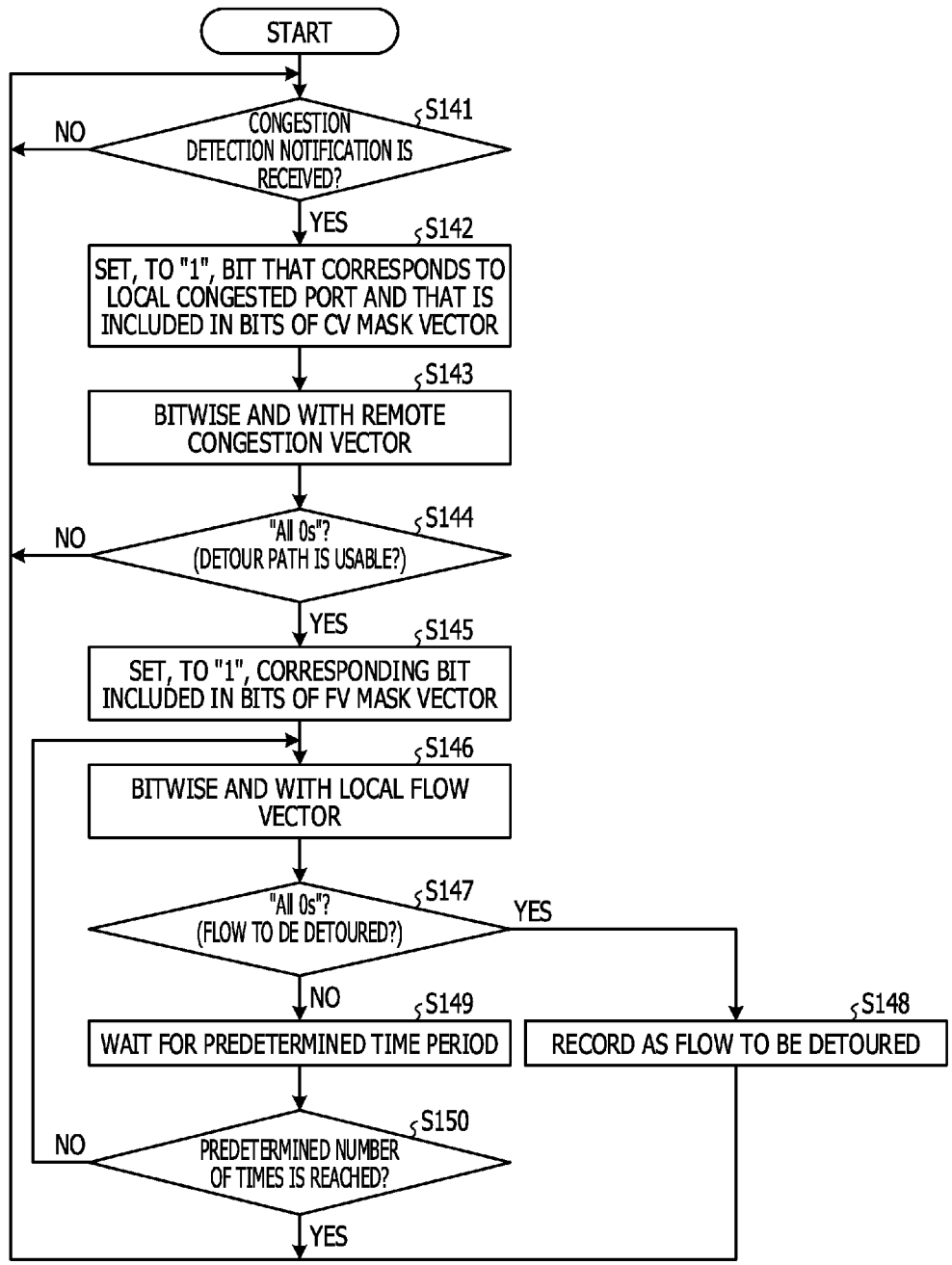
FIG. 20 is a flowchart illustrating a flow of processing for selection of a detour flow based on an LAG traffic control unit according to the second embodiment.

Next, a flow of processing for selection of a detour flow based on the LAG traffic control unit 41 according to the second embodiment will be described. FIG. 20 is a flowchart illustrating the flow of processing for selection of a detour flow based on the LAG traffic control unit 41 according to the second embodiment. As illustrated in FIG. 20, the LAG traffic control unit 41 determines whether or not a congestion detection notification is received from the congestion detection notification unit 26 (S141). In a case where it is determined that a congestion detection notification is not received, the LAG traffic control unit 41 waits the congestion detection notification to be received.

On the other hand, in a case where it is determined that the congestion detection notification is received, the LAG traffic control unit 41 sets, to "1", a bit that corresponds to a local congested port and that is included in bits of the CV mask vector (S142). In addition, the LAG traffic control unit 41 obtains bitwise AND of the CV mask vector and the remote congestion vector 43 (S143) and determines whether or not an operation result is "All 0s" (S144). In a case where it is determined that the operation result is not "All 0s", the LAG traffic control unit 41 returns to S141 and waits for a subsequent congestion detection notification to be received.

On the other hand, in a case where it is determined that the operation result is "All 0s", the LAG traffic control unit 41 sets, to "1", a bit that is included in bits of the FV mask vector and that corresponds to a flow group to which a target flow to serve as a target of detouring belongs (S145). In addition, the LAG traffic control unit 41 obtains bitwise AND of the FV mask vector and the local flow vector 29 of the detour source transmitting port 12b (S146) and determines whether or not an operation result is "All 0s" (S147).

In a case where it is determined that the operation result is "All 0s", the LAG traffic control unit 41 records, as a flow to be detoured, the target flow in a corresponding entry of the flow group counter 58 (S148) and returns to S141. On the other hand, in a case where it is determined that the operation result is not "All 0s", the LAG traffic control unit 41 waits for a predetermined time period (S149) and determines whether or not the predetermined number of times is reached (S150).

In a case where it is determined that the predetermined number of times is not reached, the LAG traffic control unit 41 returns to S146 and obtains bitwise AND of the FV mask vector and the local flow vector 29 of the detour source transmitting port 12b. On the other hand, in a case where it is determined that the predetermined number of times is reached, the LAG traffic control unit 41 returns to S141.

By referencing the remote congestion vector 43 in this way, the LAG traffic control unit 41 is able to determine a congestion state of a detour destination.

As described above, in the second embodiment, the control message transmission and reception unit 42 transmits and receives the control messages each including the congestion information and writes, as the remote congestion vector 43 and the remote flow vector 44, the control messages in the memory 14. Accordingly, the congestion information is shared between the spines. In addition, after confirming a congestion state of a detour destination by using the remote congestion vector 43, the LAG traffic control unit 41 performs detouring. The LAG traffic control unit 41 references the local flow vector 29, thereby selecting, as a flow to be detoured, a flow whose packet is not stored in the corresponding output queue 12c. Accordingly, the switch 40 is able to avoid reversal of the arrival order of packets due to a detour and to efficiently perform detouring. In the second embodiment, in a case where a congestion state is released, a detour of a flow is cancelled in order not to use a detour path. Accordingly, the switch is able to perform efficient packet relay without using ISL whose band is narrow.

Third Embodiment

Figure 21:
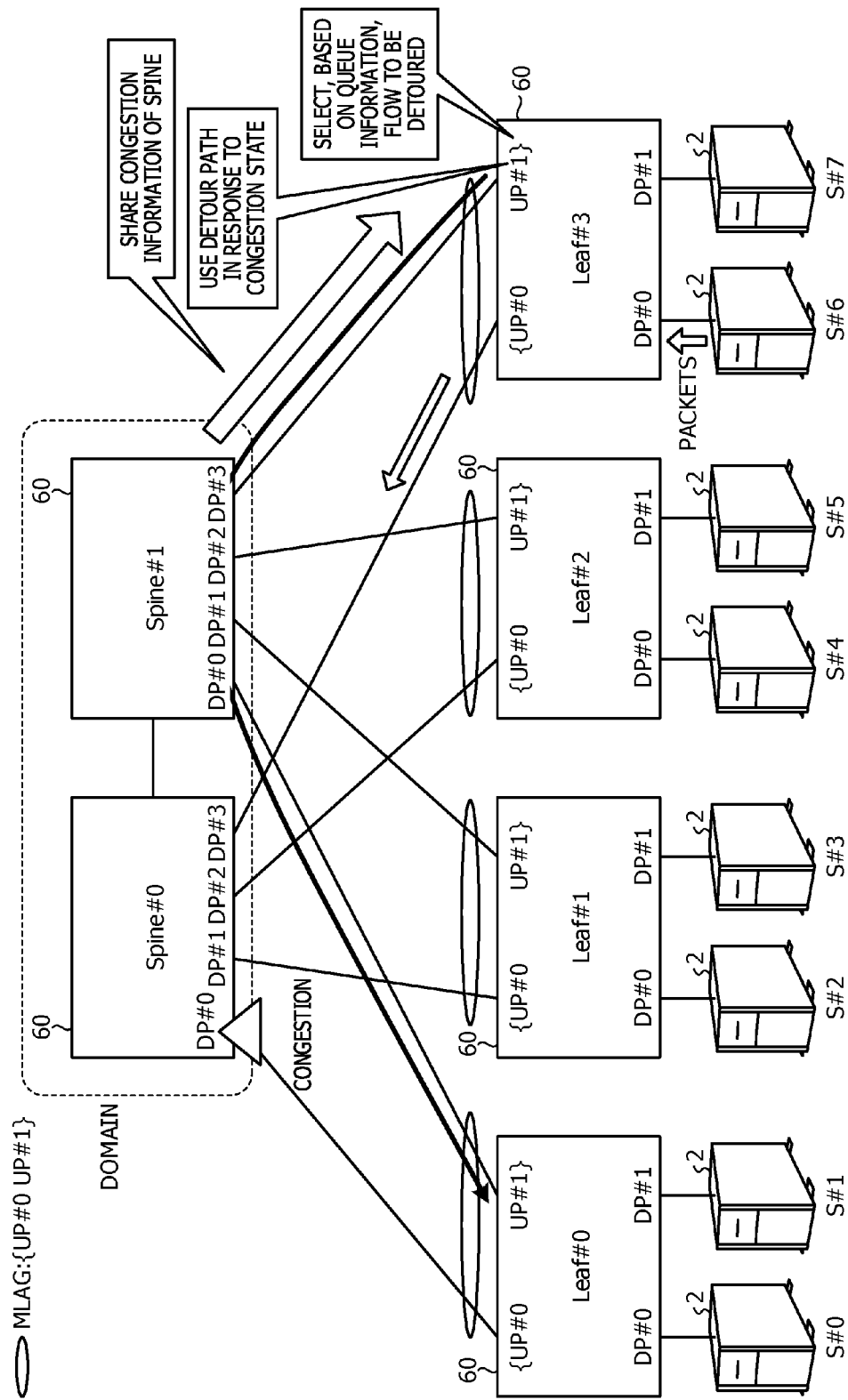
FIG. 21 is a diagram for explaining path changing based on a switch according to a third embodiment.

While a case where the congestion information is shared between spines is described in the second embodiment, a case where a leaf shares congestion information of a spine will be described in a third embodiment. FIG. 21 is a diagram for explaining path changing based on a switch according to the third embodiment. In FIG. 21, the switch according to the third embodiment is indicated as a switch 60.

As illustrated in FIG. 21, Spine#0 and Spine#1 share congestion information with Leaf#0 to Leaf#3. In addition, upon sensing a congestion state in a path of Spine#0, each of the leafs changes a path by confirming that neither another port of the relevant leaf nor a path of Spine#1 is congested.

Upon sensing a congestion state in, for example, a path of Spine#0, Leaf#3 changes a path by confirming that neither UP#1 nor DP#0 of Spine#1 is congested. In addition, Leaf#3 selects, based on the queue information of Leaf#3 itself, a flow whose path is to be changed, and Leaf#3 detours the flow. After that, if the congestion state of Spine#0 is released, Leaf#3 confirms queue information of each of Leaf#3 itself and Spine#1, used in a detour path, and restores a path of the detoured flow to an original path.

Figure 22A:
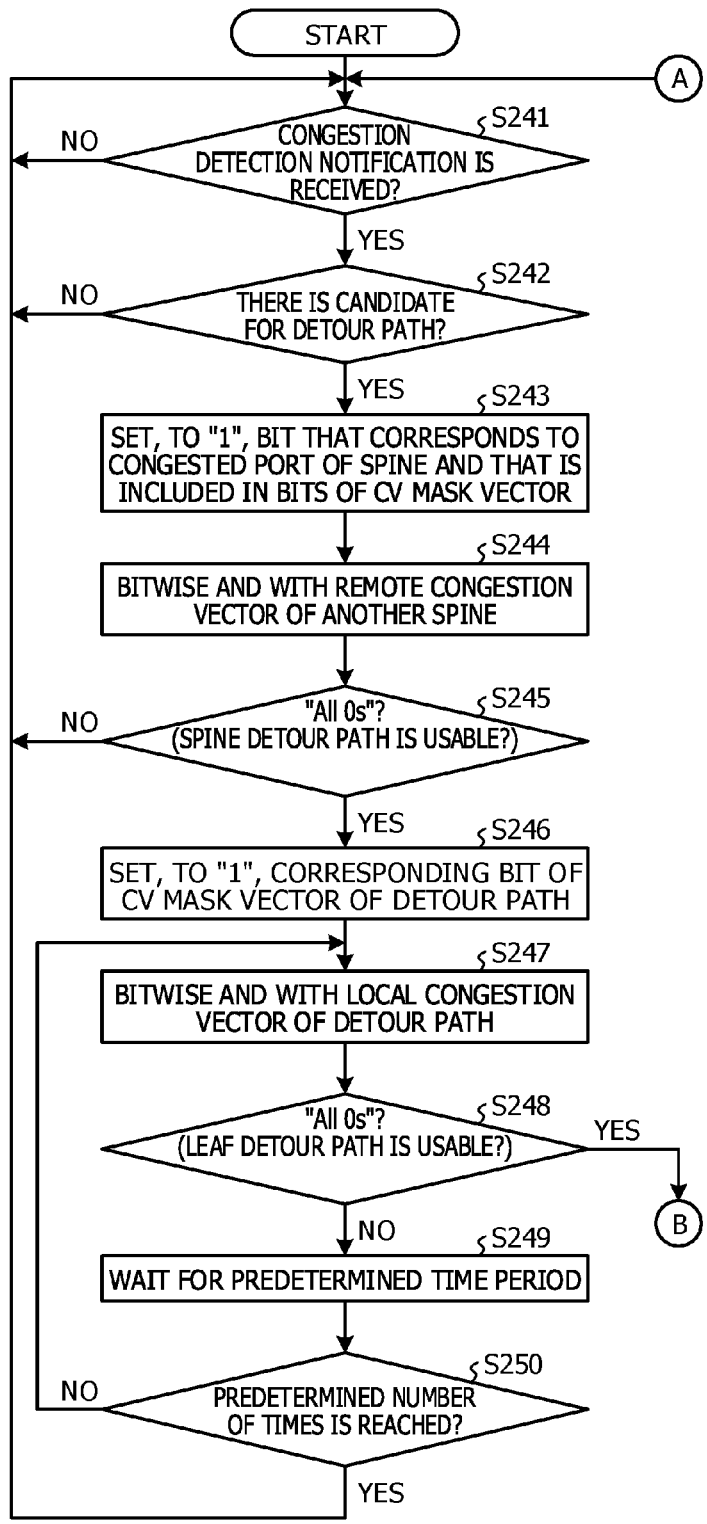
FIG. 22A is a first flowchart illustrating a flow of processing for selection of a detour flow based on an LAG traffic control unit according to the third embodiment.
Figure 22B:
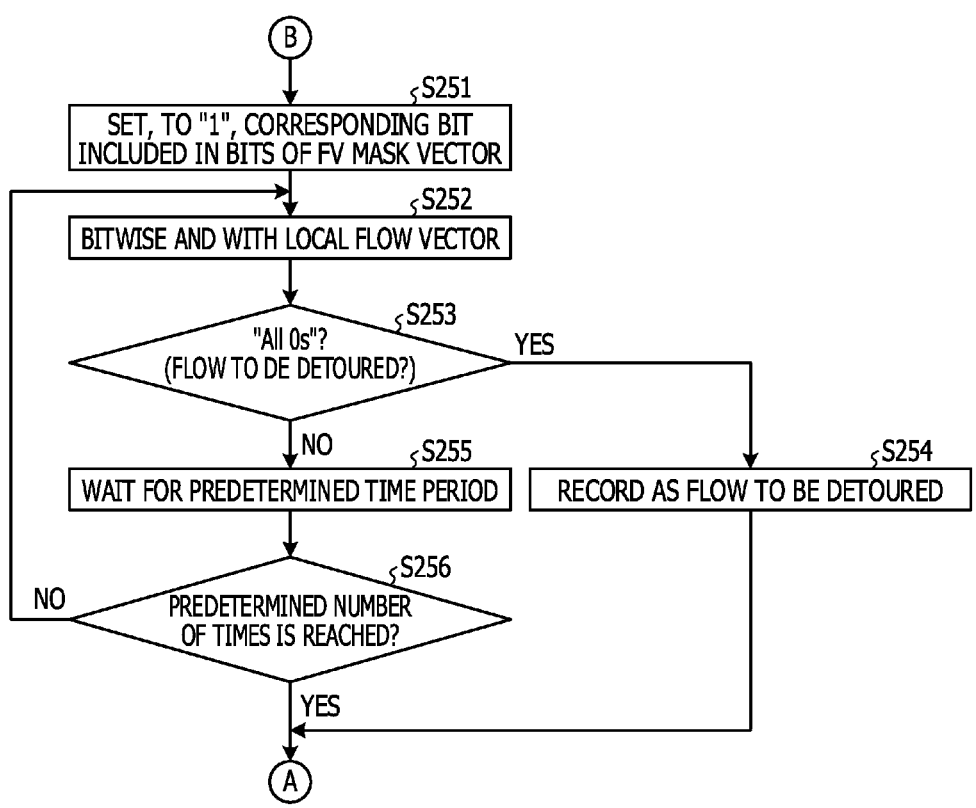
FIG. 22B is a second flowchart illustrating a flow of processing for selection of a detour flow based on the LAG traffic control unit according to the third embodiment.

FIG. 22A and FIG. 22B are flowcharts each illustrating a flow of processing for selection of a detour flow based on an LAG traffic control unit according to the third embodiment. Here, the LAG traffic control unit according to the third embodiment is an LAG traffic control unit included in each of the leafs. As illustrated in FIG. 22A, the LAG traffic control unit determines whether or not a congestion detection notification is received (S241). In a case of being determined as not received, the LAG traffic control unit waits the congestion detection notification to be received.

On the other hand, in a case of being determined as received, the LAG traffic control unit determines whether or not there is another transmitting port 12b to serve as a candidate for a detour path (S242). In a case where it is determined that there is no other transmitting port 12b to serve as a candidate for a detour path, the LAG traffic control unit returns to S241 and waits for a subsequent congestion detection notification to be received.

On the other hand, in a case where it is determined that there is the other transmitting port 12b to serve as a candidate for a detour path, the LAG traffic control unit sets, to "1", a bit that corresponds to a congested port of a spine and that is included in bits of the CV mask vector (S243). In addition, the LAG traffic control unit obtains bitwise AND of the CV mask vector and the remote congestion vector 43 of another spine (S244) and determines whether or not an operation result is "All 0s" (S245). In a case of being determined as not "All 0s", the LAG traffic control unit returns to S241 and waits for a subsequent congestion detection notification to be received.

On the other hand, in a case of being determined as "All 0s", the LAG traffic control unit sets, to "1", a corresponding bit of the CV mask vector of the detour path (S246). In addition, the LAG traffic control unit obtains bitwise AND of the CV mask vector and the local congestion vector 27 of the detour path (S247) and determines whether or not an operation result is "All 0s" (S248).

In a case of being determined as not "All 0s", the LAG traffic control unit waits for a predetermined time period (S249) and determines whether or not the predetermined number of times is reached (S250). In a case where it is determined that the predetermined number of times is not reached, the LAG traffic control unit returns to S247 and obtains bitwise AND of the CV mask vector and the local congestion vector 27 of the detour path again. On the other hand, in a case where it is determined that the predetermined number of times is reached, the LAG traffic control unit returns to S241.

On the other hand, it is determined, in S248, that the operation result is "All 0s", as illustrated in FIG. 22B, the LAG traffic control unit sets, to "1", a bit that is included in bits of the FV mask vector and that corresponds to a flow group to which a target flow to serve as a target of detouring belongs (S251). In addition, the LAG traffic control unit obtains bitwise AND of the FV mask vector and the local flow vector 29 of the detour source transmitting port 12*b* (S252) and determines whether or not an operation result is "All 0s" (S253).

In a case of being determined as "All 0s", the LAG traffic control unit records, as a flow to be detoured, the target flow in a corresponding entry of the flow group counter 58 (S254) and returns to S241. On the other hand, in a case of being determined as not "All 0s", the LAG traffic control unit waits for a predetermined time period (S255) and determines whether or not the predetermined number of times is reached (S256).

In a case where it is determined that the predetermined number of times is not reached, the LAG traffic control unit returns to S252 and obtains bitwise AND of the FV mask vector and the local flow vector 29 of the detour source transmitting port 12*b* again. On the other hand, in a case where it is determined that the predetermined number of times is reached, the LAG traffic control unit returns to S241.

Figure 23:
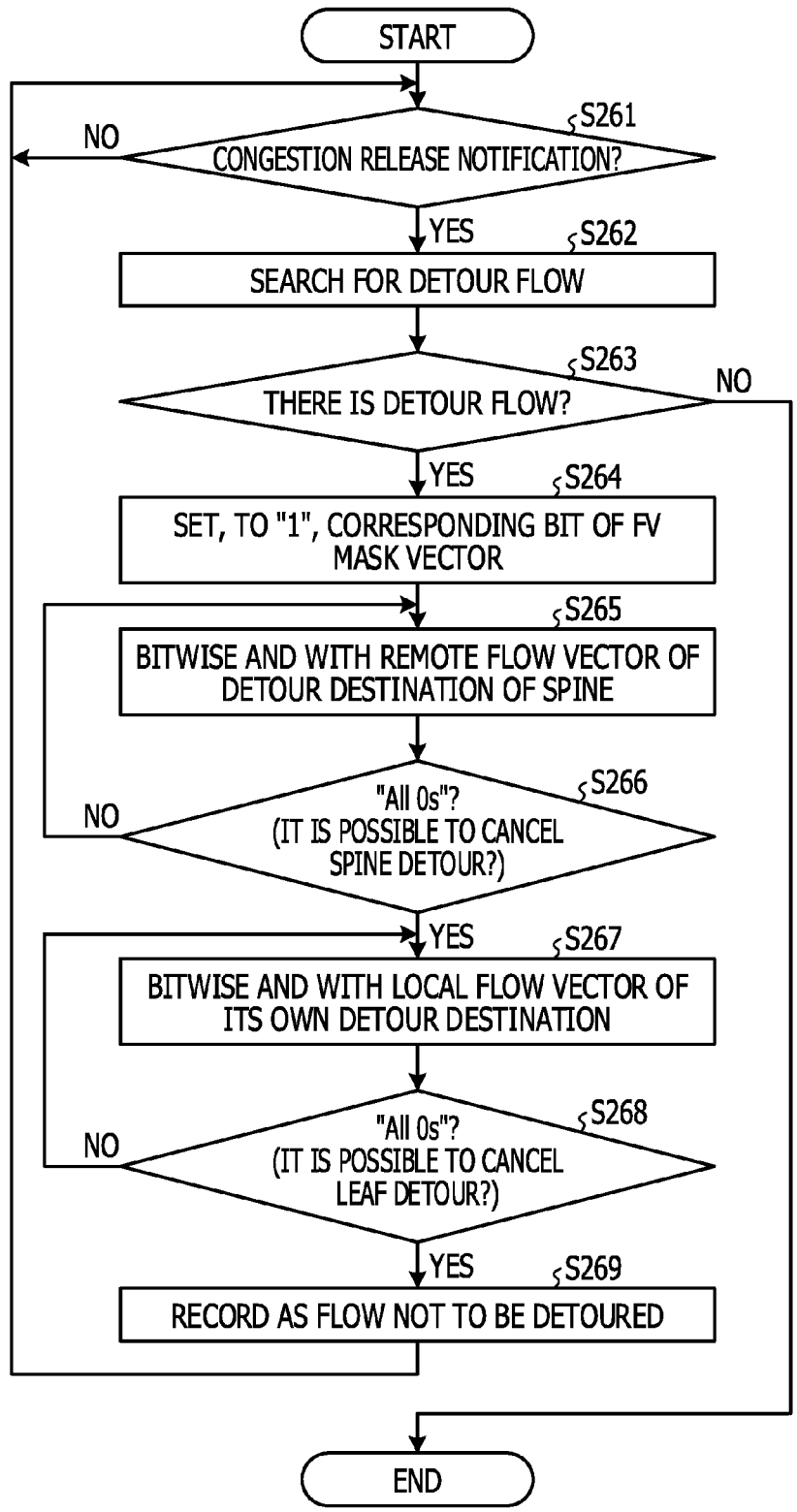
FIG. 23 is a flowchart illustrating a flow of processing for flow detour cancellation based on the LAG traffic control unit according to the third embodiment.
Figure 24:
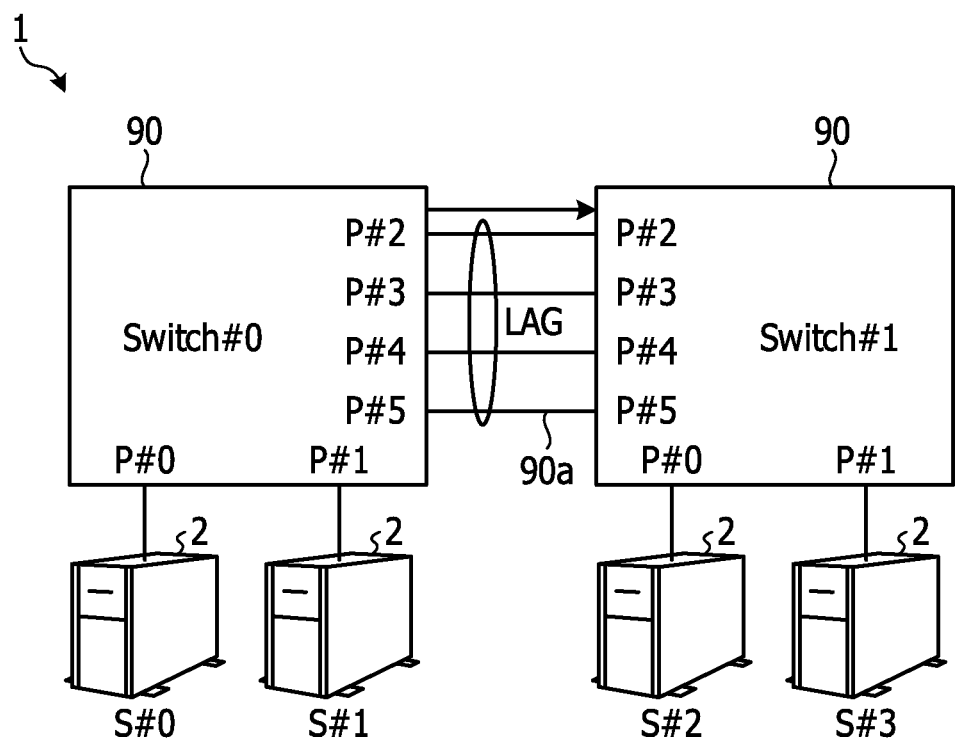
FIG. 24 is a diagram for explaining LAG.

FIG. 23 is a flowchart illustrating a flow of processing for flow detour cancellation based on the LAG traffic control unit according to the third embodiment. As illustrated in FIG. 23, the LAG traffic control unit determines whether or not a congestion release notification is received (S261). In a case of being determined as not received, the LAG traffic control unit waits for the congestion release notification to be received.

On the other hand, in a case of being determined as received, the LAG traffic control unit references the flow group counter 58 of the transmitting port 12*b* corresponding to a port of a spine, in which congestion is released, and the LAG traffic control unit searches for a detour flow (S262). In addition, the LAG traffic control unit determines whether or not there is a detour flow (S263). In a case where it is determined that there is no detour flow, the LAG traffic control unit terminates the processing.

On the other hand, in a case where it is determined that there is a detour flow, the LAG traffic control unit sets a corresponding bit of the FV mask vector to "1" (S264) and obtains bitwise AND of the FV mask vector and the remote flow vector 44 of a detour destination of a spine (S265). In addition, the LAG traffic control unit determines whether or not an operation result is "All 0s" (S266).

In a case of being determined as not "All 0s", the LAG traffic control unit returns to S265, and in a case of being determined as "All 0s", the LAG traffic control unit obtains bitwise AND of the FV mask vector and the local flow vector 29 of its own detour destination (S267). In addition, the LAG traffic control unit determines whether or not an operation result is "All 0s" (S268).

In a case of being determined as not "All 0s", the LAG traffic control unit returns to S267, and in a case of being determined as "All 0s", the LAG traffic control unit records, as a flow not to be detoured, in a corresponding entry of the flow group counter 58 (S269).

As described above, in the third embodiment, leafs share the congestion information of a spine. Therefore, if congestion occurs in a spine, a leaf changes to a detour path. Accordingly, the switch 60 is able to perform efficient detouring without using ISL whose band is narrow.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch device comprising:
   a plurality of ports which transmits packets included in a flow, respectively; and
   a processor configured to:
   detect congestion in a port of the plurality of ports, based on an amount of packets stored in a queue corresponding to the port,
   receive, from another switch device, congestion information relating to the another switch device,
   determine whether a detour path via the another switch device is usable to avoid the congestion based on the received congestion information,
   specify a port coupled to the detour path of the plurality of ports when it is determined that the detour path is usable,
   select, from among a plurality of flows, a target flow, the target flow being selected based on packets of the target flow not being stored in a queue of the specified port,
   transmit a plurality of packets belonging to the target flow by using the detour path,
   select, from among the plurality of flows, another flow of which packets are stored in the queue of the specified port, and
   transmit a plurality of packets belonging to the another flow using a path different from the detour path.

2. The switch device according to claim 1, wherein the processor is configured to
   cancel use of the specified port when the packets included in the target flow are not stored in the queue of the specified port, in a case where it is detected that the congestion is released.

3. The switch device according to claim 1, wherein
   the plurality of ports respectively includes a counter configured to count a length of a queue correspondingly provided, and
   the processor is configured to determine that congestion occurs when a value of the counter exceeds a predetermined threshold value.

4. The switch device according to claim 3,
   wherein the length of the queue is the number of packets stored in the queue, and
   the value of the counter is incremented when a packet is input to the queue, and the value of the counter is decremented when a packet is output from the queue.

5. The switch device according to claim 1, wherein the processor is configured to
   extract the target flow from among the plurality of flows by referencing packet information that is set for each of the plurality of flows and that includes a flag indicating whether or not a packet belonging thereto is stored.

6. The switch device according to claim 1, wherein the processor is configured to:
   receive a packet, and
   when congestion is detected in a transmission port allocated to the received packet and when the received packet is determined as a session request indicating that a new flow is generated, transmit a plurality of packets included in the new flow using the specified port.

7. The switch device according to claim 1, wherein a transmission order of the plurality of packets is preliminarily defined.

8. The switch device according to claim 1, wherein the plurality of links configure link aggregation.

9. A control method executed by a switch device including a plurality of ports which transmits packets in a flow, respectively, the control method comprising:
    detecting congestion in a port of the plurality of ports, based on an amount of packets stored in a queue corresponding to the port;
    receiving, from another switch device, congestion information relating to the another switch device;
    determining whether a detour path via the another switch device is usable to avoid the congestion based on the received congestion information,
    specifying a port coupled to the detour path of the plurality of ports when it is determined that the detour path is usable;
    selecting, from among a plurality of flows, a target flow, the target flow being selected based on packets of the target flow not being stored in a queue of the specified port;
    transmitting a plurality of packets belonging to the target flow using the detour path,
    selecting, from among the plurality of flows, another flow of which packets are stored in the queue of the specified port, and
    transmitting a plurality of packets belonging to the another flow using a path different from the detour path.

10. The control method according to claim 9, further comprising:
    receiving a packet, and
    when congestion is detected in a transmission port allocated to the received packet and when the received packet is determined as a session request indicating that a new flow is generated, transmitting a plurality of packets included in the new flow using the specified port.

11. A non-transitory computer-readable storage medium storing a program that causes one or more processors included in a computer to execute a process, the process comprising:
    detecting congestion in one of a plurality of ports, based on an amount of packets stored in a corresponding one of a plurality of queues;
    receiving, from another switch device, congestion information relating to the another switch device;
    determining whether a detour path via the another switch device is usable to avoid the congestion based on the received congestion information,
    specifying a port coupled to the detour path of the plurality of ports when it is determined that the detour path is usable;
    selecting, from among a plurality of flows, a target flow, the target flow being selected based on packets of the target flow not being stored in a queue of the specified port;
    transmitting a plurality of packets belonging to the target flow using the detour path,
    selecting, from among the plurality of flows, another flow of which packets are stored in the queue of the specified port, and
    transmitting a plurality of packets belonging to the another flow using a path different from the detour path.

12. The storage medium according to claim 11, wherein the process further comprises:
    receiving a packet, and
    when congestion is detected in a transmission port allocated to the received packet and when the received packet is determined as a session request indicating that a new flow is generated, transmitting a plurality of packets included in the new flow using the specified port.

* * * * *